(12) United States Patent
Minano et al.

(10) Patent No.: US 7,520,641 B2
(45) Date of Patent: Apr. 21, 2009

(54) ETENDUE-SQUEEZING ILLUMINATION OPTICS

(75) Inventors: Juan C. Minano, Madrid (ES); Pablo Benitez, Madrid (ES); Yupin Sun, Yorba Linda, CA (US); William A. Parkyn, Lomita, CA (US); Roberto Alvarez, South Pasadena, CA (US); Waqidi Falicoff, Newport Beach, CA (US)

(73) Assignee: Light Prescription Innovators, LLC, Altadena, CA (US)

( * ) Notice: Subject to any disclaimer, the term of this patent is extended or adjusted under 35 U.S.C. 154(b) by 0 days.

(21) Appl. No.: 12/119,039

(22) Filed: May 12, 2008

(65) Prior Publication Data

US 2008/0212328 A1    Sep. 4, 2008

Related U.S. Application Data

(63) Continuation of application No. 10/772,088, filed on Feb. 3, 2004, now Pat. No. 7,377,671.

(60) Provisional application No. 60/445,059, filed on Feb. 4, 2003.

(51) Int. Cl.
*F21V 7/00* (2006.01)

(52) U.S. Cl. ................... 362/297; 362/346; 362/347; 362/507; 362/514; 362/545

(58) Field of Classification Search ............. 362/297, 362/346, 518, 241, 235, 240, 341, 347, 800, 362/555, 516, 545, 459, 507, 514, 517
See application file for complete search history.

(56) References Cited

U.S. PATENT DOCUMENTS

| 3,746,853 | A | * | 7/1973 | Kosman et al. | 362/301 |
|---|---|---|---|---|---|
| 4,868,723 | A | * | 9/1989 | Kobayashi | 362/497 |
| 5,471,371 | A | * | 11/1995 | Koppolu et al. | 362/555 |
| 6,554,455 | B2 | * | 4/2003 | Perlo et al. | 362/297 |
| 6,773,143 | B2 | * | 8/2004 | Chang | 362/346 |
| 6,846,100 | B2 | * | 1/2005 | Imazeki et al. | 362/517 |
| 7,347,599 | B2 | * | 3/2008 | Minano et al. | 362/511 |
| 7,377,671 | B2 | * | 5/2008 | Minano et al. | 362/297 |
| 2004/0145910 | A1 | * | 7/2004 | Lisowski | 362/519 |

* cited by examiner

*Primary Examiner*—Jacob Y Choi
(74) *Attorney, Agent, or Firm*—Thomas F. Lebens; Sinsheimer Juhnke Lebens & McIvor, LLP

(57) ABSTRACT

In some embodiments, an apparatus for use generating illumination is provided that comprises a reflective base, a first light source positioned proximate the reflective base, and a reimaging reflector positioned partially about the first light source, where a percentage of light emitted from the first light source is reflected from the reimaging reflector to the reflective base adjacent the first light source establishing a first real image. The reimaging reflector can further comprise a first sector of a first ellipsoid and a second sector of a second ellipsoid, where the first and second sectors establish the first and a second real image. Further embodiments provide a lens that includes a reimaging reflector that receives light and reflects the light establishing a first real image. The reimaging reflector can further comprise a plurality of sectors that reflect light to establish first and second real images.

29 Claims, 22 Drawing Sheets

ETENDUE-SQUEEZING ILLUMINATION OPTICS

PRIORITY CLAIM

This application is a continuation of application Ser. No. 10/772,088, filed Feb. 3, 2004, entitled ETENDUE-SQUEEZING ILLUMINATION OPTICS, which claims the benefit of U.S. Provisional Application No. 60/445,059, file Feb. 4, 2003, entitled ETENDUE-SQUEEZING ILLUMINATION OPTICS, both of which are incorporated herein by reference in their entirety.

TECHNICAL FIELD OF THE INVENTION

The present invention relates generally to optical illumination lenses, and more particularly to etendue-squeezing primary source-optics utilizing either commercially available packaged LEDs or immersive-lens designs suitable for LEDs mounted in the chip-on-board fashion.

BACKGROUND OF THE INVENTION

Among the more challenging illumination tasks for solid-state lighting is forward lighting meeting predefined criteria, such as forward lighting for vehicles, utilizing non-thermal light sources, e.g. light-emitting diodes (LEDs). The lifetime of LEDs in the vibration environment of a ground vehicle is far greater than that of conventional incandescent sources. Some recently developed white LEDs are surpassing the significant 100-lumen luminosity threshold, marking the feasibility of fulfilling that most difficult of all forward vehicle lighting tasks, automotive-headlight intensity standards. Peak intensities in the tens of thousands of candela, however, can not be achieved with LEDs alone.

Beyond efficiency, moreover, automotive design pressures for highly compact forward-lighting systems pose severe tradeoffs of device size against attainment of sharp intensity cutoffs required to minimize glare to other vehicles. Prior LED optics employ unacceptable device size when compared to competing incandescent-source designs such as projector lamps.

SUMMARY OF THE INVENTION

The above needs are at least partially met through provision of the method, apparatus, and system for using generating illumination that, in some embodiments, utilize etendue squeezing described in the following detailed description, particularly when studied in conjunction with the drawings. In some embodiments, an apparatus for use generating illumination is provided that comprises a reflective base, a first light source positioned proximate the reflective base, and a reimaging reflector positioned partially about the first light source, where a percentage of light emitted from the first light source is reflected from the reimaging reflector to the reflective base adjacent the first light source establishing a first real image of the first light source adjacent the first light source such that the reflective base reflects the light of the first real image. The reimaging reflector can, in some embodiments, be generally a quarter ellipsoid with a first focus positioned on the first light source and a second focus positioned proximate the first light source at a position of the first real image and below the reflective base at a height below a surface of the reflective base equal to a height of a light emitting surface of the first light source from the surface. In some embodiments, the reimaging reflector can further comprise a first sector of a first prolate ellipsoid and a second sector of a second prolate ellipsoid, where the first and second sectors joined along an axis.

Some alternative embodiments provide apparatuses for use in transmitting light. These apparatuses can comprise a first etendue squeeze light source comprising a first reimaging reflector positioned partially about the first light source, where a percentage of light emitted from the first light source is reflected from the first reimaging reflector establishing a first real image of the first light source adjacent the first light source. Some embodiments further include a second etendue squeeze light source. A luminaire is often included in many embodiments, where the luminaire comprises first and second reflective surfaces, where the first source is positioned proximate an edge of the second reflective surface to direct light onto the first reflective surface, and the second source is positioned proximate an edge of the first reflective surface to direct light onto the second reflective surface. The first and second sources can each further include a free-form lens positioned to receive light from the respective light source and the respective first and second real images, such that the light passes through the free-form lens at solid angle subtended by dimensions of the corresponding first and second reflector surfaces. In some embodiments, a luminaire is included that is generally boat-shaped, with first and second reflective surfaces being generally paraboloidal, with the first source being positioned at a focal point of the paraboloidal first surface and the second source being positioned at a focal point of the paraboloidal second surface.

Further embodiments provide a lens that includes a reimaging reflector positioned to receive a percentage of a total light received by the lens. The reimaging reflector reflects the percentage of light establishing a first real image that is further directed away from the reimaging reflector and into the lens. The reimaging reflector can be generally ellipsoidal in shape. Additionally and/or alternatively, the reimaging reflector can further comprise a plurality of sectors where each sector is defined by a prolate ellipsoid, such that a first sector reflects a first sub-percentage of the percentage of light establishing the first real image, and a second sector reflects a second sub-percentage of the percentage of light establishing a second real image that is further directed away from the reimaging reflector and into the lens. Some lens embodiments further comprises a first etendue-squeezing reflector and a second etendue-squeezing reflector both positioned to receive a percentage of the total light received. The first etendue-squeezing reflector can have a profile comprises a parabola segment and an ellipse segment, where the parabola segment and the ellipse segment both have a common axis of revolution and meeting with the same tangent.

Some preferred embodiment provide for a method of manufacturing an optical device. The method can comprise defining a first position for placement of an optical source; and defining a first prolate paraboloidal surface further comprising defining a first focus at the first position and defining a second focus at a second position a first distance from the first position in a first direction, providing a three-dimensional representation of an optical source. The defining of the second focus can further include defining a plane relative to the optical source and the first position such that a second distance is defined in a second direction from the plane to an emitting surface of the optical source, and defining the second focus of the first paraboloidal surface at a third distance defined in a third direction from the plane to the second focus where the third distance is equal to the second distance such that the third direction is opposite the second direction.

Additional embodiments provide methods for manufacturing an optical device. These methods can comprises generating a two-dimensional representation of a plurality of entry surfaces and a plurality of corresponding reflective surfaces, and exit surface; rotationally sweeping the two-dimensional representation about a central axis providing a three-dimensional representation of the plurality of entry and corresponding reflective surfaces, and exit surface; and defining a cutout of the three-dimensional representation that extends from about a center of the three-dimensional representation at the central axis to a periphery of the three-dimensional representation providing a three-dimensional representation of an optical lens. Some embodiments additionally comprise defining an optical source for positioning proximate the central axis that further comprises: defining a first position for placement of an optical source; and defining a first prolate paraboloidal surface that includes defining a first focus at the first position, and defining a second focus at a second position a first distance from the first position in a first direction. The defining the optical source can further comprises defining a second prolate paraboloidal surface by defining a first focus of the second prolate paraboloidal surface at the first position, and defining a second focus of the second prolate paraboloidal surface at a third position a first distance from the first position in a second direction opposite the first direction.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
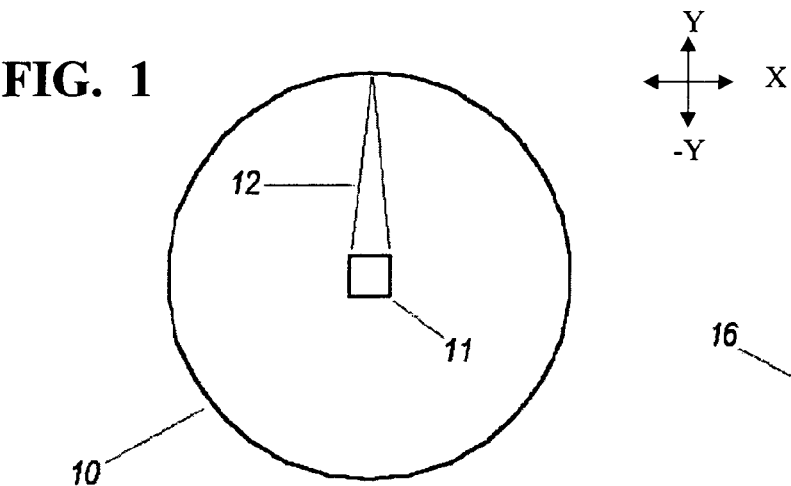
FIG. 1 depicts a simplified elevated view of a circular aperture that surrounds a centrally positioned light source.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

A better understanding of the features and advantages of the present embodiments will be obtained by reference to the following detailed description of the invention and accompanying drawings, which set forth illustrative examples in the design of which the principles of the embodiments are utilized.

The present embodiments provide for apparatuses and methods for etendue squeezed light sources, as well as optics and/or luminaries that utilize the etendue squeezed light sources and are optimized through the use of the optics.

Some embodiments provide sources can be utilized to provide forward vehicle lighting, such as headlights for automobiles that satisfy some of the most challenging forward vehicle-lighting prescriptions. Present embodiments can further utilize light-emitting diodes (LED) as well as solid-state chip-on-board light sources in general. Moreover, the preferred embodiments disclosed herein can include configurations comprising separately molded luminaires and lenses in which the solid-state chip-on-board light sources are immersed.

The present embodiments relate generally to optical illumination lenses, and some preferred embodiments utilize immersive lens designs suitable for LEDs mounted in the chip-on-board fashion. Immersion refers to the practice of surrounding an LED with a transparent dielectric. This can increase the light-extraction efficiency over the operation of the LED in air, by decreasing Fresnel reflectance and reducing the extent of total internal reflection within the chip. The present embodiments furthermore can utilize tailored free-form folded optics to meet particular prescriptions, such as prescriptions for forward vehicular lighting. The present embodiments can be employed in illumination lenses utilizing a novel optical principle, that of etendue squeezing, for example through ellipsoidal reimaging as fully described below.

The immersive lens of the LEDs and/or optics utilized with the LEDs can be formed from substantially any relevant material, such as plastics, polymers, glass, silicon and other such material. Plastic optics can be formed through injection molding of transparent polymeric plastics such as acrylic, polycarbonate, polyarylate, cyclo-olefins, and other similar materials. The cyclo-olefins group, for example, can be used at high operating temperatures, for example at 161° C., as exemplified by a cyclo-olefin based product Zeonor 1600R, produced by Zeon Corporation of Japan. Optical injection molding is also possible with silicones, while low-pressure molding is possible with glass.

The terms used herein of light and illumination are not restricted to the visible wavelength range of 380 to 750 nanometers, but can additionally encompass the entire ultraviolet and infrared range that is amenable to geometric optics. In these non-visible ranges, the present embodiments have similar technological benefits to those it provides in the visible range. Further, the present embodiments can be equally applied to near-ultraviolet LEDs, which may be primary light sources for exciting visible-light phosphors.

In the near-infrared regime (e.g., 700-1100 nm), night-vision illuminators based on the present embodiments can be implemented to use commercially available near-infrared LEDs as light sources for lenses that can be molded of the above-mentioned materials, in the same manner as for visible-light illuminators.

Previous LEDs were generally too fragile to withstand the rigors of the injection-molding process. Recently, however, new chip-on-board designs have eliminated the delicate gold-wire leads that could not withstand injection molding. Now it becomes possible to precisely mold miniature optical elements adjacent to an LED chip. In some embodiments this ability to precisely mold optical elements adjacent to LED chips is utilized.

Government and industry standards for vehicular forward lighting involve a high-intensity hot-spot with a broader and less intense overall pattern that gradually extends sideways but must fall off very rapidly above the horizontal plane. In addition, headlights must have high-beam capability, which requires even higher intensity levels in the hot-spot. Attempts to fulfill such prescriptions through previous LED optics involved configurations that are too thick for injection molding to be suitably produced and/or implemented. Alternatively, the present embodiments provide luminaire designs with the device size greatly reduced compared with previous device sizes that were necessary to fulfill forward-lighting prescriptions.

The present embodiments configure and/or arrange light sources to establish a high-performance etendue light source and/or optics. A conserved quantity of a bundle of light rays, etendue, is the product of a bundle area and its projected solid angle. A solid angle, measured in steradians (sr), can be visualized as a piece of the sky, where a projected solid angle refers to a unit circle below the unit hemisphere on which solid angle is defined.

A solar concentrator makes a small solar image via its concentrated solar rays converging on its collector from over a much wider angle than the half-degree angular width of the Sun as its nearly parallel rays entered the concentrator. Conversely, a searchlight mirror transforms the omnidirectional emission of a small source into a large well-directed beam with narrow angular width. Both for concentrators and collimators, area and angle are traded off, but their product, etendue, generally cannot increase because it is an invariant property of any ray bundle, from the moment the bundle was created by the light source. By geometric necessity, etendue can only be reduced by removing rays from a bundle. The etendue concept can be considered generally analogous to the entropy concept in thermodynamics, where entropy according to the Second Law of thermodynamics never decreases.

Etendue is the phase-space volume of a bundle of light rays. If lateral coordinates x and y are defined across a device aperture $\Sigma$, two angles can be defined according to a light ray passing through these axes. Ray-directions can be defined by variables p and q, defined according to the cosines of the above two angles, and as multiplied by a local refractive index n. Thus the dimensions of phase space are x, y, p, and q. Whether a bundle of rays is concentrated or collimated, its phase-space volume does not change.

The etendue can be determined for substantially any light source. For example, if a light source is defined by a square LED chip having an encapsulated dome with an index of refraction n, the etendue of this LED source can be given by:

$$E = \pi n^2 (D^2 + 2DL), \qquad \text{Eq. 1}$$

where D is the width and L is the length of the LED. For example, if the LED source has a width D=2 mm, and height L=0.18 mm, and the LED is further encapsulated within a spherical dome (such as a dome made of a cyclic olefin copolymer) having an index of refraction n=1.53, and the LED is located on a planar mirror so that its side emission radiates into a full hemisphere, the etendue equals E=34.71 mm$^2$-sr according to Equation 1.

Similarly, a circular collimator with a nominal diameter (e.g., a diameter of two inches, minus 1 mm for mounting), an optical radius R (for example, a radius R=24.5 mm) and that emits into air can provide an output beam, of half-angle $\theta$, that has an etendue defined according to:

$$E = (A_e)(\pi \sin^2 \theta), \qquad \text{Eq. 2}$$

where $A_e=\pi R^2$ is the output area. If all of the source rays of the output beam exit within the half-angle θ of a system axis, the output etendue equals the source etendue, and the half-angle can be defined by:

$$\theta = \sin^{-1}\sqrt{\frac{E}{\pi^2 R^2}}, \qquad \text{Eq. 3}$$

so that θ=4.4° is the approximate minimum possible output half-angle, beyond which beam intensity would be generally zero. When luminaire intensity is non-uniform, however, this angle is called the telecentric approximation, since it often turns out to be close to the angle of half-maximum intensity. As such, the etendue can be defined as a volume in a four-dimensional phase space. The etendue can additionally and/or alternatively be defined according to a two-dimensional phase space with a light source specified by its width D and projected angle, which is given by twice the sine of the half-angle θ. The two-dimensional etendue can be represented as an area on the planar phase space defined according to:

$$E_{2d} = 2n\,D\sin\theta. \qquad \text{Eq. 4}$$

This two dimensional representation of the etendue measure is useful when analyzing rotationally symmetric optics in terms of their diameter and average beam divergence. Commercially available LED chips are typically squares cut out of a wafer, whereas the rotational symmetry of a circular chip provides a direct comparison of a full 4-D etendue with 2-D etendue. A disc source of width D and height L, embedded in a medium of refractive index n, emits hemispherically so that θ=90°, giving 2-D etendue according to:

$$E_{2d} = n(2D+2L), \qquad \text{Eq. 5}$$

which results in a two dimensional etendue of 6.67 mm (where D=2 mm, L=0.18 mm and n=1.53, as in the example above). The corresponding minimum half-angle is defined according to:

$$\theta_{2d} = \sin^{-1}\frac{E_{2d}}{4R}, \qquad \text{Eq. 6}$$

which equals $\theta_{2d}$=3.90° in continuing the example above where R=24.5 mm. The discrepancy with slightly larger value above for a square chip can be reconciled by considering the four dimensional etendue of a rotationally symmetric disc source of diameter D and height L:

$$E = \pi n^2\left(\pi\frac{D^2}{4}\right) + \frac{\pi}{2}n^2(\pi DL), \qquad \text{Eq. 7}$$

so that the etendue E=27.25 mm²-sr and the four dimensional half-angle $\theta_{4d}$=3.90°.

The output beam of a collimator can be decomposed into elemental beamlets emitted from small patches of its output surface. The $i^{th}$ beamlet has etendue $E_i$, so the total beam has etendue is defined by the summation:

$$E = \sum_i E_i. \qquad \text{Eq. 8}$$

One of the important aspects of the present embodiments is the varying shapes and angular sizes of these beamlets across the output surface of a luminaire. For example, an edge of a parabolic reflector or mirror that is the farthest from a source provides a narrower beamlet than more central positions on the reflector closer in proximity to the source. As such, the total output beam of a parabola can be defined as a collection of beamlets of different widths, but all being substantially parallel to the system axis. In the case of vehicular forward lighting, however, the narrower beamlets are typically directed so as to promote a rapid vertical cutoff.

Some present embodiments alternatively utilize de-centered collimator segments illuminated by etendue-squeezing source optics. The uses of these de-centered, etendue-squeezing sources are fully described below.

The United States Department of Transportation (DOT) utilizes a logarithmic definition of intensity gradient (G) at vertical angle θ, according to the intensity values I(θ) and I(θ+0.1°): G=$\log_{10}$ I(θ)−$\log_{10}$ I(θ+0.1°). DOT regulation FMVSS 108 mandates G>0.13 for forward transmitting vehicular headlights. A gradient according the this mandate results in an intensity reduction or shrinkage equal to $10^{-0.13}$=0.741 for every 0.1 degree, a factor of about twenty smaller in only 1° of elevation. To accomplish this, previous systems require luminaires to be big enough that its smallest beamlets could be used to meet this difficult standard, resulting in excessively large and impractical luminaries. Alternatively, some present embodiments employ etendue squeezing allowing for luminaries that are substantially more compact while still meeting the regulatory standards and manufacturer preferences in its prescription.

The present embodiments implement the etendue squeezing through one of at least two methods, and in some embodiments employ more than one squeezing method. In some embodiments the etendue squeezing produces non-circular beamlets with a narrow vertical extent. Such non-circular bundles are directed so as to achieve a high vertical intensity gradient. The thinness of some LED chips, particularly green, blue, and white LEDs based on gallium indium nitride, assist this effect through their oblique rays bearing a very thin and elongated chip-image. Some embodiments alternatively and/or additionally implement the etendue squeezing by shrinking the narrowest beamlets. The shrinking of the narrowest beamlets is achieved in some embodiments by de-centering a light source.

In previous devices, an omnidirectional light source is typically placed at the center of a luminaire. Alternatively, the present embodiments position a light source so that the light source is not centered with respect to the luminaire and in some embodiments position the light source at an edge of a luminaire. De-centering the light source lengthens the distance from the light source to the farthest point of the aperture, making the narrowest beamlet even narrower than would be achieved in previous devices. This de-centering and/or edge-placement additionally positions the source closer to the external environment, thereby reducing the thermal paths for removing the source's waste-heat.

Some embodiments additionally redirect portions of the source light to more completely utilize the source flux. For example, additional optical means are employed near the source so as to redirect what might be unused portions of the omnidirectional emission into the luminaire, as is discussed fully below. When placement of the source is at an edge of a luminaire, about half of the omnidirectional emission might be redirected and in some instances more than half depending on the positioning and configuration of the luminaire. In some preferred embodiments employing LED light sources, the dimensions of the optics employed in redirecting emissions are maintained to a minimum, for example, only a few times bigger than the LED source. Further, the redirecting device and/or optics can include a precisely predefined shape and have precise positioning relative to the source. Some embodiments utilize in-mold-chip-on-board features to implement the redirectional device and/or positioning relative to the source.

In some embodiments, a non-circular aperture is additionally utilized. The aperture can be altered from a circular configuration to accommodate the peripheral placement of the source and to lengthen the distance from the light source to the farthest point of the aperture narrowing the beamlet. For simplicity, implementation of off-center positioning of a source and/or the aperture re-shaping is hereinafter referred to as etendue squeezing, and is further elucidated below.

A further desired effect and/or desideratum for some lighting, such as vehicular lighting, is a compact configuration. Previous lighting devices often required long optical path lengths in order to meet exacting prescriptions. These long paths typically resulted in unacceptable device sizes. The present embodiments alternatively incorporate folded optics to provide increased path lengths while limiting the size of the lighting devices.

The present embodiments additionally can be configured to include freeform optical surfaces specifically configured to shape an output beam to both low- and high-beam automobile headlight patterns. As such, the present embodiments can utilize LED light sources to power any number of lighting devices, such as automotive headlights. Previous automotive headlights utilized incandescent sources that have much higher power consumption than the LED sources. Additionally, the present invention takes advantage of LED's much higher tolerance to vibration and shock, and much longer lifetimes, which can generally exceed the expected operating life of automobiles.

Figure 2:
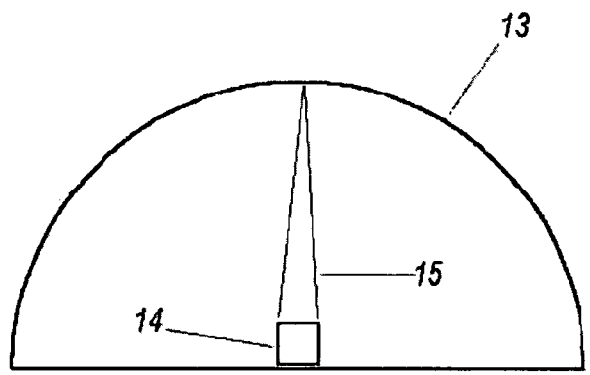
FIG. 2 shows an elevated view of an aperture having a semicircular configuration with an area that is approximately equal to the area of the circular aperture of FIG. 1.
Figure 3:
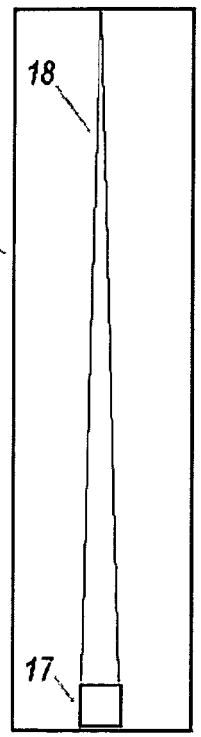
FIG. 3 depicts a rectangular aperture that has substantially the same area as the circular aperture of FIG. 1, but with a length that is about four times the radius of the circular aperture.

FIGS. 1-3 schematically depict simplified elevated views of three aperture shapes having substantially the same geometric area: a circular aperture 10, a semicircular aperture 13, and a rectangular aperture 16, respectively. Because their areas are substantially equal, the overall etendue of their output beams will typically be the same (assuming a similar source is employed). It is the narrowest beamlet, however, that is of interest to the present embodiments. The actual size of the sources shown in these diagrams places them within the purview of the small-angle approximation, whereby a small angle and its sine and tangent can be used interchangeably:

$$\sin \theta \sim <\theta \sim <\tan \theta.$$

For example, at the ±7.5° of beamlet 12, the sin(θ), θ and tan(θ) in radians equal 0.13053, 0.13090, and 0.13165, respectively, with a difference or an error of +0.6%/−0.3%. The resulting difference or error is even smaller for beamlets 15 and 18 of FIGS. 2 and 3, respectively. Further, the difference or error does not reach ±1% until the angle of the beamlet is about θ=14°.

FIG. 1 depicts a simplified elevated view of a circular aperture 10 that surrounds a centrally positioned light source 11. A beamlet 12 is defined by a pair of rays that span the distance from source 11 to the periphery of the aperture 10. The ratio of the radius of source 11 to that of the radius of the aperture 10 defines an angular semi-width of the beamlet 12 that is the narrowest beamlet from the luminaire. It is noted that for the sake of simplicity, FIGS. 1-3 do not show beamlets 12, 15, and 18 being redirected out of the plane of the paper, the direction of emission from the apertures 10, 13, and 16, respectively.

FIG. 2 shows an elevated view of an aperture 13 having a semicircular configuration with an area that is approximately equal to the area of the circular aperture 10 of FIG. 1. The distance from the source 14 to the periphery of the semicircular aperture 13, however, is about $\sqrt{2}$ times greater than the distance 12 from the source 11 to the periphery of the circular aperture 10 of FIG. 1. The beamlet 15 is accordingly about $\sqrt{2}$ times narrower in angle than the beamlet 12 of circular aperture 10 of FIG. 1.

Referring to FIG. 3, a rectangular aperture 16 is shown that has substantially the same area as circular aperture 10 of FIG. 1, but the length of the aperture 16 is about four times the radius of the circular aperture 10. The beamlet 18 is thus also about four times smaller in angular width than beamlet 12.

The de-centering of a light source relative to an aperture lengthens the distance from the light source to the farthest point of the aperture and provides for the reduced beamlet angular width. The reduced angular width provided by the off center positioning of the source allows, in part for the promotion of a rapid vertical cutoff. Additionally, the narrowed beamlet angular width can provide for a high vertical intensity gradient.

Figure 4:
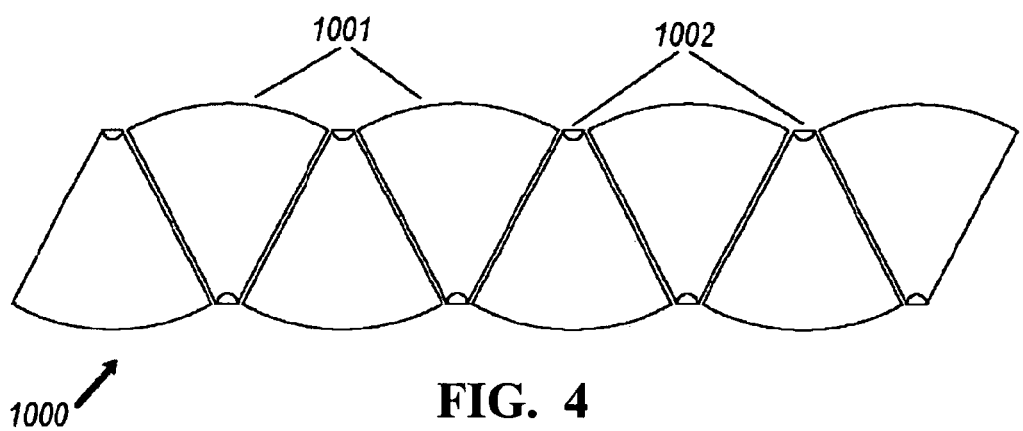
FIG. 4 shows a simplified block diagram of a linear array of multiple triangular luminaires with decentered, peripherally positioned, light sources.

FIG. 4 depicts an array 1000 of equilateral generally triangular-shaped luminaires 1001, each with lensed light source 1002, which advantageously lie on an edge of the luminaries. By positioning the sources 1002 on an edge of the array, the tasks of conveying electric power to and removing waste heat from the sources are simplified.

Some preferred embodiments utilize edge-placement tactics and/or additionally redirect omnidirectional source-emissions to be redirected into a narrower solid angle subtended by an aperture from the source, to in part avoid wasting luminous flux. In utilizing a semi-circular aperture such as the aperture of FIG. 2, for example, the present embodiments redirect substantially all, and preferably all of the flux that would have been direction in a −Y direction to instead be redirected in the +Y direction and thereby into semicircular aperture 13.

This redirection can be achieved in some embodiments through the utilization of a mirror. For example, a vertically oriented planar mirror could be used, but such a flat mirror would preferably be positioned immediately adjacent to the source 14, to avoid a dark gap that might appear between the source and its adjacent image. A hemispheric mirror positioned to be centered on the source could be employed with sources that allowed free passage of those reflected rays avoiding dark gaps, and LEDs typically do not allow free passage of reflected rays.

In one preferred embodiment of the present invention, the redirection of light from the source can be implemented through an ellipsoid reflector, with non-imaging achieved by designing and position the ellipsoid with its focus at an edge of the source. The edge-ray principle of non-imaging optics utilized in the present embodiments advantageously strive to ensure that substantially all, and preferably all reflected source-rays appear to come from an image immediately adjacent to the source, even though a surface of an ellipsoid reflector itself is distant from the source.

Figure 5:
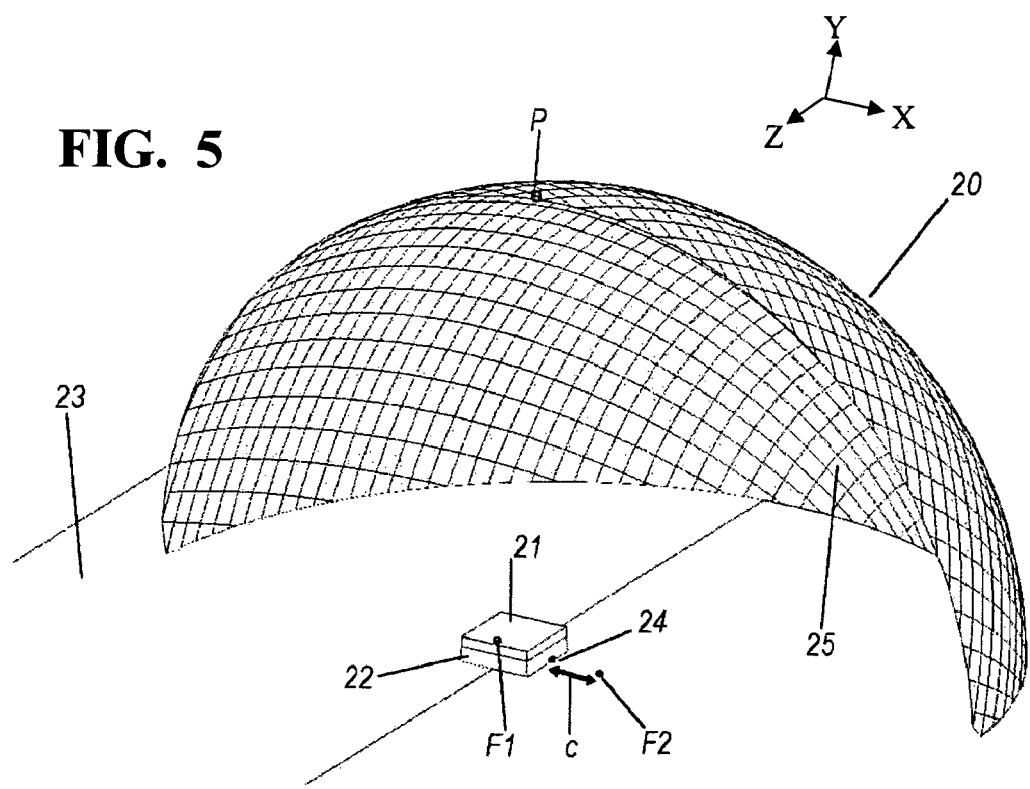
FIG. 5 depicts the configuration of a prolate-ellipsoidal reimaging mirror with central LED.

FIG. 5 depicts a simplified schematic view of a portion of a prolate ellipsoid reflector 20, an LED chip 21, a substrate 22, and a cutaway view of a mirror or reflective base 23. The LED 21 and ellipsoid reflector 20 are positioned relative to each other such that a first focus F1 of the ellipsoid is positioned on the surface of chip 21, at a point (F1X,F1Y,F1Z) that is in some preferred embodiments on the edge of the LED, and a second focus F2 is positioned at a point (F2X,F2Y,F2Z). In some preferred embodiments, the ellipsoid reflector is configured and/or positioned relative to the source such that the second focus F2 is positioned to be below the mirror 23, and laterally displaced from the first focus F1 by a width W of the LED chip 21. The real image can be positioned such that a small safety gap or guard-distance Δ can be included between the source and an adjacent real image of the source, which can be any sized gap, for example about 0.05 mm in some embodiments, depending on the size of the source, ellipsoid reflector, and other similar factors.

The surface of ellipsoidal mirror 20 can further be configured according to some design considerations to pass through a point P at (PX,PY,PZ). The size of ellipsoidal mirror 20 is relative to the size of the source 21 in achieving accurate reimaging. An ellipsoid center 24 lies midway between the first and second foci F1 and F2, with a center-to-focus distance c given by $$c = \tfrac{1}{2}\sqrt{(F1X-F2X)^2 + (F1Y-F2Y)^2 + (F1Z-F2Z)^2}.$$

The location of surface point P fulfills the definition of an ellipse as the locus of points of constant sum 2a of the distances from it to each focus, where a is the semi-major axis, accordingly given by:

$$a = \frac{1}{2}\left(\sqrt{\begin{array}{l}[(PX-F1X)^2 + (PY-F1Y)^2 + (PZ-F1Z)^2] + \\ [(PX-F2X)^2 + (PY-F2Y)^2 + (PZ-F2Z)^2]\end{array}}\right).$$

A Semi-minor axis b is given by $b = \sqrt{a^2 - c^2}$, completing the specification of the ellipsoid by the coordinates of the foci and of a single point on its surface. Prolate ellipsoid 20 is delineated by polar grid 25, which is aligned with axis defined by a line joining foci F1 and F2.

Still referring to FIG. 5, the ellipsoid is configured such that the second focus F2 is defined to have a depth below the mirror 23 that is twice the height at which the first focus F1 above the mirror. This is so that the real image of the chip, as formed by ellipsoid 20, is at same height as the chip itself. In some embodiments, the second focus F2 can also be shifted slightly further away from the LED chip 21 so that there is a small gap between the chip and its real image, in an attempt to avoid reflected rays from hit the chip.

Similar etendue squeezing can be achieved with other shaped sources such as rectangular, oval and substantially any other shape with the source off center and appropriate reflectance to generate reimaging and achieve the desired illumination pattern. As described above with reference to FIG. 3, a source can be rectangular with the LED positioned off center.

Figure 6:
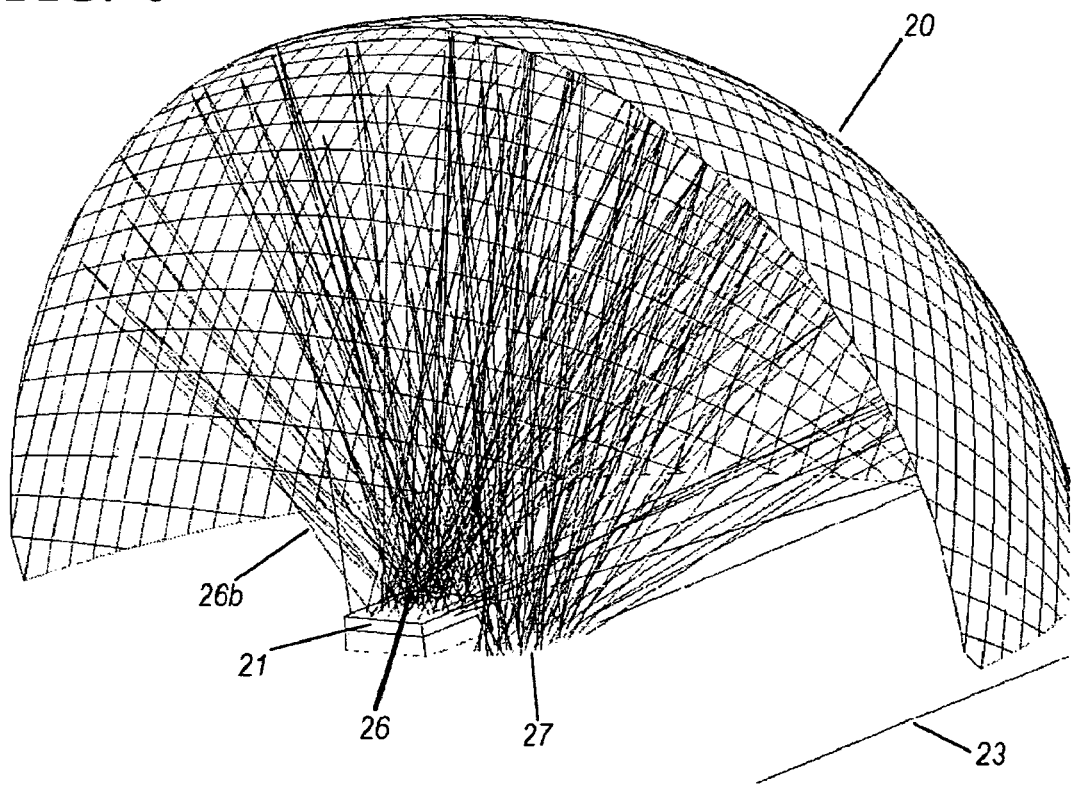
FIG. 6 depicts the reimaging operation of this mirror.

FIG. 6 depicts the reimaging action of prolate ellipsoidal reflector 20 on a percentage of emission 26 from chip 21. A real image 27 is formed on mirror 23, adjacent to chip 21, of the percentage of the light emitted from the light source 21 that impinges the reimaging reflector 20. The real image 27 thereafter acts as a virtual source equivalent to another chip at that location. The percentage of rays striking reflector 20 would have otherwise continued outward, but are now recruited into image 27. A difficulty arises in some implementations, however, as shown by rays 26b, which can be seen to intercept chip 21 on their way to image 27. Some present embodiments alleviate this problem by utilizing a two-sector ellipsoid reflector.

Figure 7:
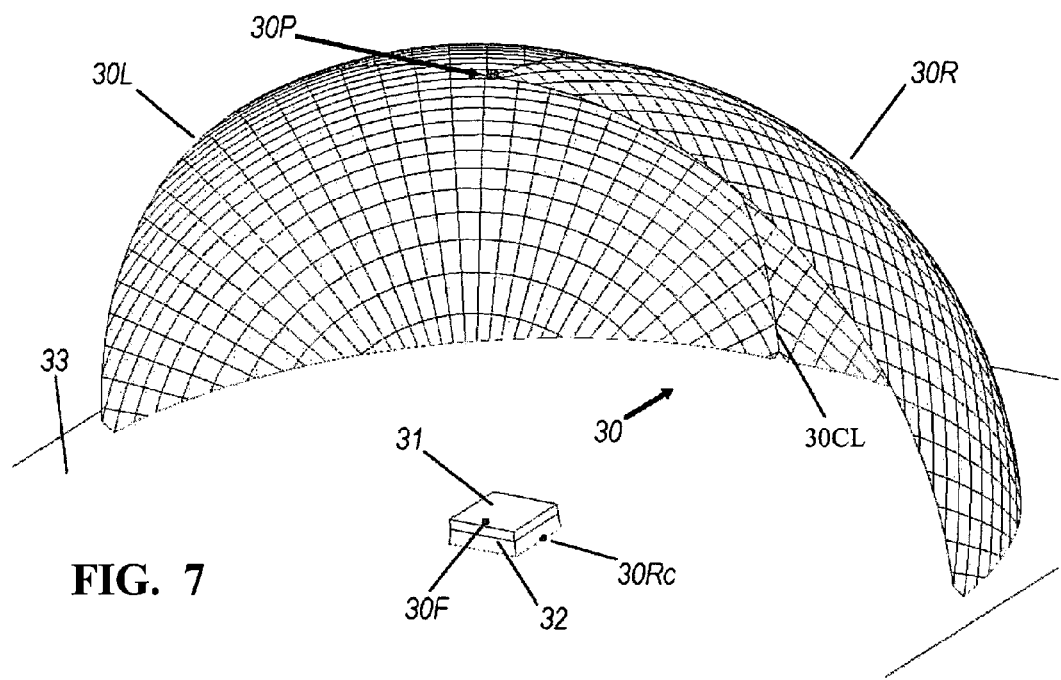
FIG. 7 depicts a two-sector reimaging mirror.

FIG. 7 depicts a simplified elevated view of a two-sector reimaging mirror 30 according to some embodiments. Reimaging mirror 30 includes a first or left-half prolate ellipsoid 30L and second or right-half prolate ellipsoid 30R, each configured similarly in specification and in some embodiments substantially identical in specification, to ellipsoid 20 of FIG. 2 and FIG. 2A. Right-half prolate ellipsoid is centered at point 30Rc, while left-half prolate ellipsoid 30L has a corresponding center point, not shown, on the other side of source 31. The two sectors abut and are joined along centerline 30CL and share defining point 30P. LED chip 31, substrate 32, and mirror or reflective base 33 are similar to those described above in relation to FIG. 2.

Figure 8:
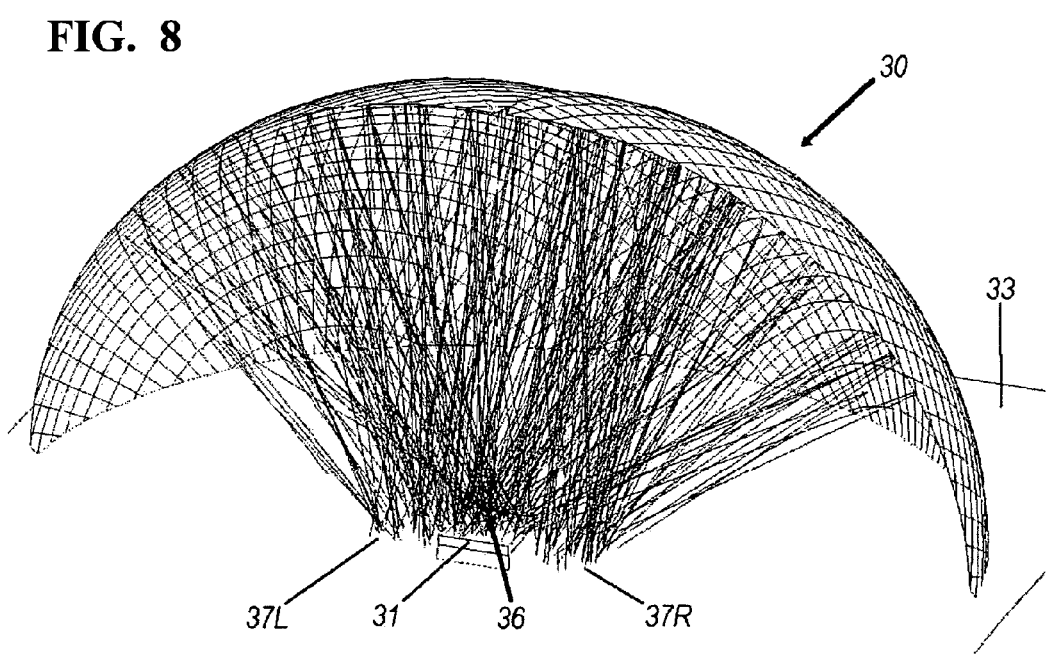
FIG. 8 depicts is optical operation forming two images.

FIG. 8 depicts the reimaging action of two-sector ellipsoidal reflector 30 of FIG. 3. LED chip 31 produces emission and a percentage of the emissions 36 are directed toward the reimaging reflector 30. A sub-percentage of the emissions are reimaged by right-side reimaging reflector or mirror 30R providing a right-side real image 37R and another sub-percentage of the emissions are reimaged by left-side reimaging mirror 37L providing a left-side real image 37L. In utilizing the two ellipsoid halves 30R and 30L, the present embodiments solve the problem of rays impacting the source as described above in relation to FIG. 2A. It can also be seen that right-side image 37R radiates into the front-right quadrant of directions. Thus images 37R, and 37L equally, each bear approximately 25% of the etendue of light source 31, as is fully discussed below, for example with respect to FIG. 11 below. However, the amount reflected by the ellipsoidal reflector depends on the size of the ellipsoidal and the placement of the source relative to the ellipsoidal.

Figure 9:
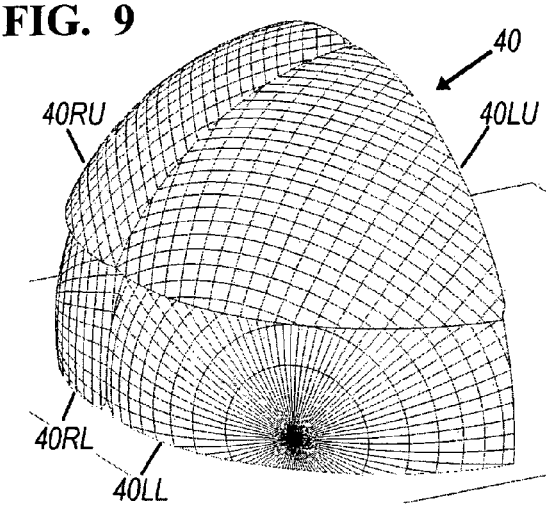
FIGS. 9 and 10 depict two views of a four-sector reimaging mirror.
Figure 10:
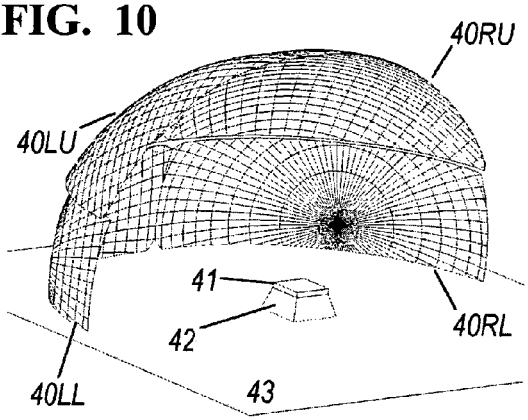

FIGS. 9-10 depict simplified schematic diagrams of a four-sector reimaging mirror 40 according to some present embodiments. Four-sector reimaging mirror 40 includes upper sectors 40RU and 40LU, and lower sectors 40RL and 40LL. Each of the four sectors meet or are joined along a center line. The four sectors 40RU, 40RL, 40LU and 40LL are configured such that the reflected rays do not impinge on the chip and rather are reflected so as to clear the height of chip slug 42, which can be employed to remove waste heat from high-power LED chip 41 and conveys it to a reflective base such as a mirrored circuit board 43. Upper ellipsoids 40RU and 40LU form real images defined below the mirror, such that the images reflected from the mirror 43 appear to come from the same height as source 41. Lower ellipsoids 40RL and 40LL, however, have their second focus at the same height as the first focus, on the edge of the chip, forming a real image.

In some embodiments, reimaging mirrors such as those depicted in FIG. 7 and FIG. 10 can be filled with a transparent dielectric. When configured as stand-alone packages, the dielectric can be epoxy or a similarly protective transparent encapsulated.

The reimaging mirrors of the present invention can be integrated with other preferred embodiments. The stand alone packages have to be bonded or otherwise secured to these devices. The bonding of the mirrors can be a laborious process that can introduce positional errors and the possibility of degrading or debilitating air bubbles. Alternatively, in some embodiments the present invention utilizes injection-moldable chip-on-board LEDs. The present invention takes advantage of their great positional accuracy of chip placement. The reimaging mirrors disclosed above become part of the external surfaces of the optical devices of the present invention. This allows an entire optical device to be completed in each brief molding cycle. Thereafter, the portions comprising the reimaging mirrors can be masked off and vacuum-metalized in cost-effectively large batches.

Figure 11:
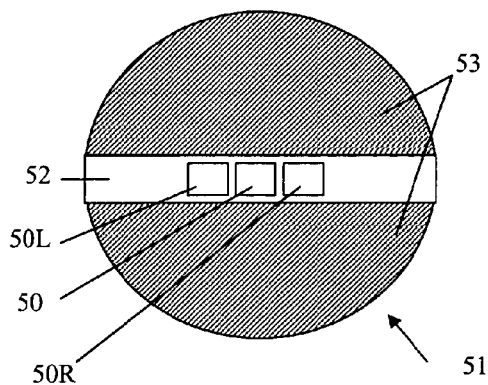
FIG. 11 depicts a means of stray-light suppression.

Referring back to FIG. 8, reimaging reflector 30 forms real images 37L and 37R to either side of light-source 31. FIG. 11 depicts a planar view of a reflective base such as a metalized surface 51, as well as LED chip 50, and two reflective images 50L and 50R isolated for clarity. LED chip 50 lies at the center of metalized surface 51. A reimaging reflector (not shown), such as a two-sector re-imaging reflector 30 (see FIG. 7), has formed images 50L and 50R on either side of chip 50, spaced laterally therefrom with a small 5% gap. Surface 51 includes specular mirror strip 52 extending to either side of chip 50, and blackened sections 53 covering portions of mirror 51 or the remainder of the mirror. Specular mirror strip 52 reflects the real images 50L and 50R back to form virtual sources. Blackened sections 52 act to suppress stray light. This implementation of the present invention achieves a rapid peripheral cutoff of light intensity. Such a cutoff is an important aspect of vehicle forward lighting, the prescriptions for which contain challenging requirements for rapid cutoffs of intensity.

Figure 12:
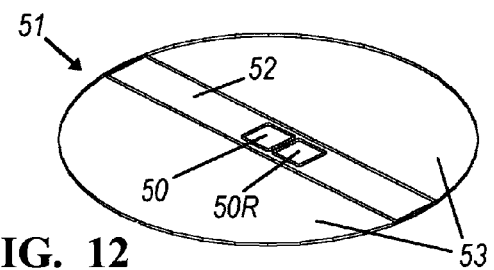
FIG. 12 depicts a right-hand view of reimaging, showing that each source image has 25% of source etendue.
Figure 13:
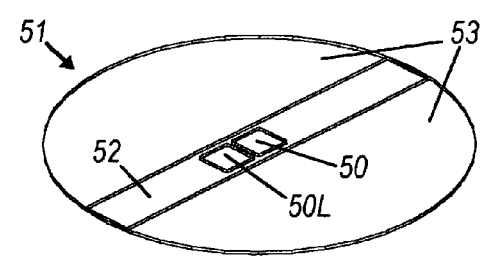
FIG. 13 depicts a left-hand view of reimaging.

The concept of etendue squeezing is elucidated in FIG. 12, depicting a right-lateral slant view of surface 51 comprising mirror strip 52 and darkened zones 53. LED chip 50 shines into an entire hemisphere of directions. A two-sector reimaging mirror, such as the reimaging mirror 30 in FIG. 7 but not shown, intercepts the rear semi-hemisphere of ray-directions and reimages them. The remaining front semi-hemisphere of directions proceed outward directly from chip 50, constituting approximately 50% of the original etendue. Right image 50R is formed by the left sector 30L of reimaging mirror 30 of FIG. 7, and thus shines into the right front quadrant of viewing directions, constituting 25% of the original etendue.

FIG. 12 is the corresponding left-lateral slant view of surface 51. LED chip 50 is directly visible from these directions as well. Right image 50R shines to the right, so left image 50L is visible instead, constituting the 25% of etendue reimaged by the right sector 30R of reimaging mirror 30 of FIG. 7.

As such, some preferred embodiments utilize the off-center positioning of the source relative to an aperture and/or the redirecting of a portion of the illuminance from the source to achieve the desired etendue squeezing. The etendue squeezing can further be utilized to provide a light source with increased light extraction efficiency and thus improved output.

Referring back to FIG. 2, semicircular aperture 13 is an example of a luminaire shape that benefits from the reimaging just described above, which generates a virtual source with emission matching the semicircle. Disclosed below are preferred embodiments exemplifying implementations for reimaging reflectors to be utilized in beam-forming luminaires, including monolithic verses stand-alone configurations.

In monolithic preferred embodiments, a relatively large luminaire is formed. Typically, the luminaire is formed through injection-molding, but it can be formed through other methods. The luminaire includes an immersed chip-on-board LED source and adjacent reimaging reflector formed by a metalized portion of its exterior, and further surfaces that utilize a folded optical path and tailored surfaces that produce the desired output pattern.

Figure 14:
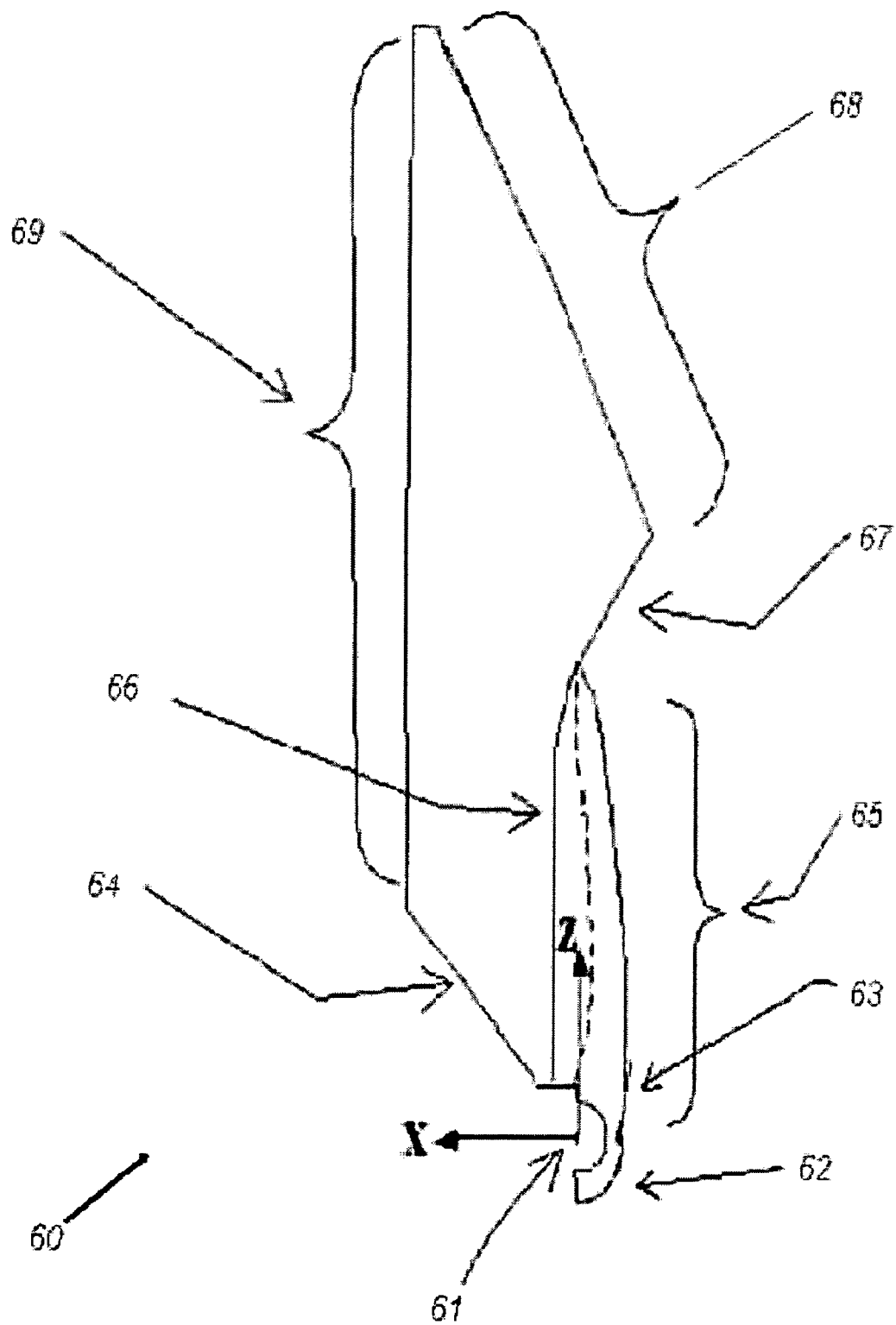
FIG. 14 is an outline of a forward-lighting preferred embodiment meeting a low-beam prescription.

FIG. 14 depicts a cross-section of monolithic injection-molded LED-activated forward-lighting lens 60. Lens 60 includes a cavity 61 for bonding to an LED light source of matching shape, reimaging mirror 62 (which can have a configuration similar to that of mirror 40 of FIG. 9 and FIG. 9), reflective surface 63, optically inactive surface 64, free-form profile 65 of fluted cylindrical reflector array 66, optically inactive surface 67, mirrored slightly cylindrical surface 68, and cylindrical output surface 69.

Figure 15:
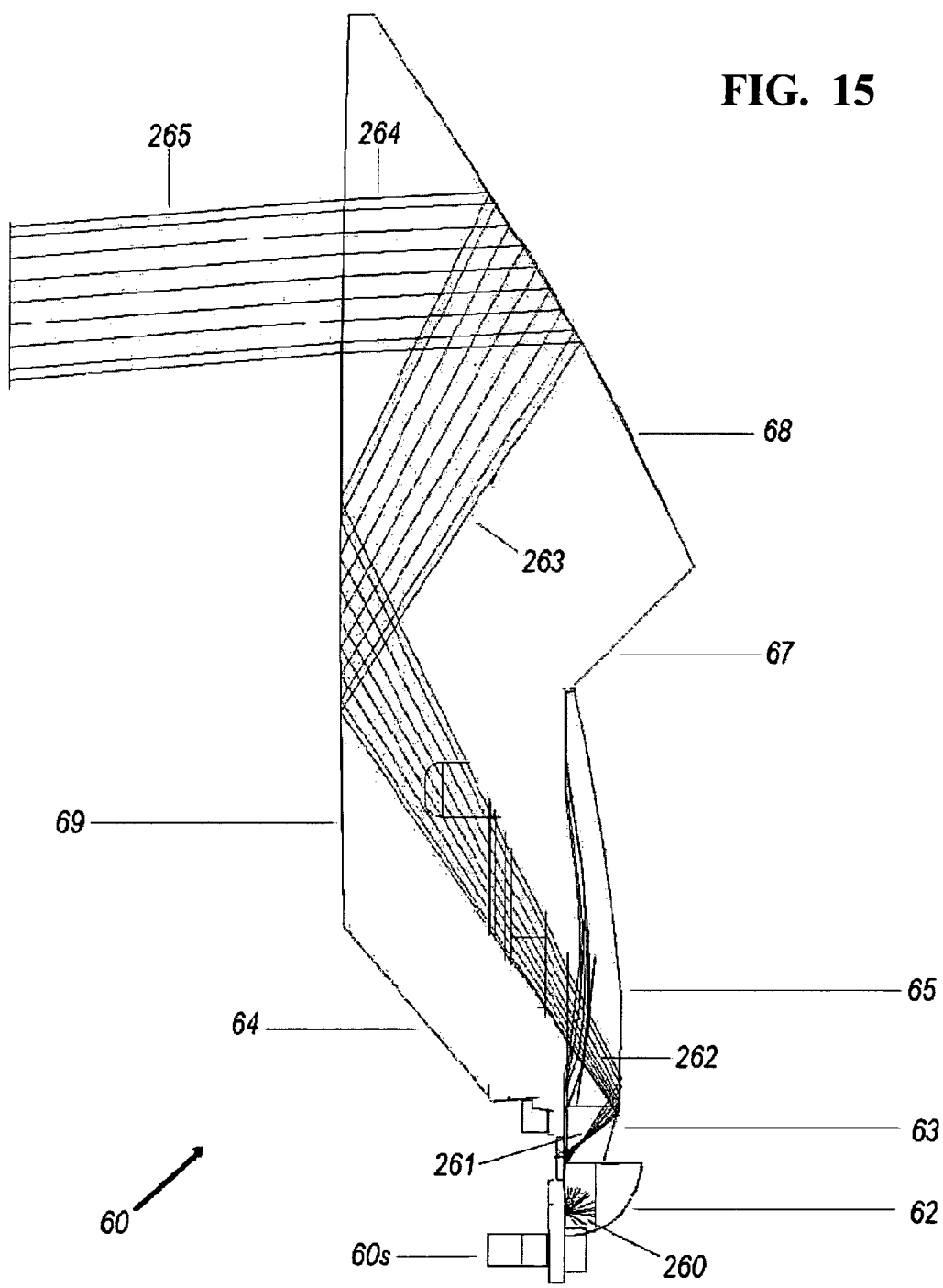
FIG. 15 shows a cross section of this preferred embodiment with its folded optical path.

FIG. 15 depicts a cross-sectional view of the lens 60 of FIG. 14 showing the folded-optics path according to one embodiment of the present invention. Light source $60s$ emits ray-fan 260. The source ray fan is reflected into rays 261, which are in turn reflected by surfaces 63 and 65 into rays 262, which propagate to cylindrical surface 69. Thereupon they are internally reflected into rays 263, which proceed to mirror or metalized reflective surface 68, which reflects them into rays 264. These rays finally pass through exit surface 69, which can in some embodiments refractively shape them into parallel output rays 265. This ray-trace is schematic in that original ray-fan 260 represents only one point on source $60s$. The full ray trace from all points of source $60s$ produces the far-field intensity pattern that can be configured to fulfill a low-beam forward-lighting prescription for vehicle lighting, but such a fully populated ray-set would be too dense to illustrate the folded-optic principle depicted in FIG. 15.

Referring to FIGS. 14 and 15, a Low-Beam version of the lens assembly 60 can comprise six LED sources $60s$ and associated cylindrical optics. The High-Beam version can include four LED sources and associated optics because the High-Beam version typically acts in concert with the Low-Beam lens to fulfill the high-beam prescription. In some particular implementations, three high- and low-beam pairs of preferred embodiments depicted in FIG. 14 are contemplated to be deployed on both the driver and passenger sides of a vehicle.

In some implementations of the lens 60 of FIG. 14, the cylindrical exit surface 69 can be specified for Low-Beam by the profile:

$$x = -2983.834126 + 300.534153\sqrt{1 - \left(\frac{z - 6030 + 036}{2227.350635}\right)^2}$$

where:

$21.2009 \le z \le 103.4.$

The Low-Beam version of slightly cylindrical-surface profile 68 of FIG. 14 can be calculated according to some embodiments by the equation:

$$x = \sum_{i=0}^{40} a_i z^i.$$

In accordance with the x and z axes shown in FIG. 14. In one embodiment, for example, with the z-coordinates ranging between $54.1465 < z < 104.257199$, the following forty, exponentially-enumerated coefficients can apply:

| | | | | | |
|---|---|---|---|---|---|
| a0 = | −2.21460914986206E+03 | a15 = | −5.14375335063617E−25 | a29 = | −2.65183970375481E−53 |
| a1 = | 2.75318242799951E+02 | a16 = | 2.07456025635039E−27 | a30 = | 1.97105582858789E−56 |
| a2 = | −1.39140271474280E+01 | a17 = | 4.43885292165034E−29 | a31 = | 9.89655644255562E−58 |
| a3 = | 3.42598288270074E−01 | a18 = | 8.75965292053517E−32 | a32 = | −6.86592593163378E−60 |
| a4 = | −3.44847449501444E−03 | a19 = | 2.98020397200867E−35 | a33 = | 1.60672475580861E−61 |
| a5 = | −1.35476338668418E−05 | a20 = | −3.22552137227001E−35 | a34 = | −9.71287078142620E−65 |
| a6 = | 4.44982939515977E−07 | a21 = | −1.23028112571408E−37 | a35 = | −4.49245295716173E−66 |
| a7 = | 2.13776164953985E−09 | a22 = | 1.81445438824544E−39 | a36 = | −1.53060029633236E−68 |
| a8 = | −8.00681271717953E−11 | a23 = | 4.39029354997865E−42 | a37 = | −1.07731162863745E−69 |
| a9 = | 3.00505167111001E−13 | a24 = | −2.48776544540972E−43 | a38 = | 9.33508280183508E−72 |
| a10 = | 3.49966331738797E−16 | a25 = | 1.87261011855604E−45 | a39 = | 2.94808304533197E−74 |
| a11 = | 4.47644506312821E−18 | a26 = | 2.15314083102648E−47 | a40 = | −2.75183781043199E−76 |
| a12 = | 2.99425509845293E−19 | a27 = | −1.25136131545428E−49 | | |
| a13 = | −6.94530535532736E−22 | a28 = | 7.09194506048832E−52 | | |
| a14 = | −1.86789647810197E−23 | a15 = | −5.14375335063617E−25 | | |

In FIG. 6, exit surface 69 can be specified for High-Beam by:

$$x = -2983.534112 + 3004.534182\sqrt{1 - \left(\frac{z - 60.0 + 0.6}{2227.350657}\right)^2}$$

where:

$21.2009 \leq z \leq 103.4$.

The High-Beam version of surface provide 68 of FIG. 14 can be calculated by:

$$x = \sum_{i=0}^{20} a_i z^i.$$

As a further example, with the z-coordinates in the range 56.3934<z, 103.505155, the following twenty exponentially-enumerated coefficients can apply:

| | |
|---|---|
| a0 = | 1.86745049546039E+02 |
| a1 = | −2.45183532823518E+00 |
| a2 = | −8.83374361022387E−01 |
| a3 = | 4.83677655754712E−02 |
| a4 = | −1.06746203638527E−03 |
| a5 = | 1.06458096224462E−05 |
| a6 = | −2.80679144614359E−08 |
| a7 = | −1.24917819162495E−10 |
| a8 = | −2.27028758125753E−12 |
| a9 = | 3.73212124311632E−14 |
| a10 = | −2.83214999584491E−16 |
| a11 = | 2.42909307529820E−18 |
| a12 = | 9.67052619279627E−21 |
| a13 = | −1.99999922061327E−22 |
| a14 = | −2.71940787015645E−24 |
| a15 = | 4.46695148016903E−26 |
| a16 = | −1.54285041259005E−28 |
| a17 = | −9.05950796672694E−31 |
| a18 = | 1.76303842155717E−32 |
| a19 = | −1.30807575155329E−34 |
| a20 = | 3.59238240211839E−37 |

Figure 16:
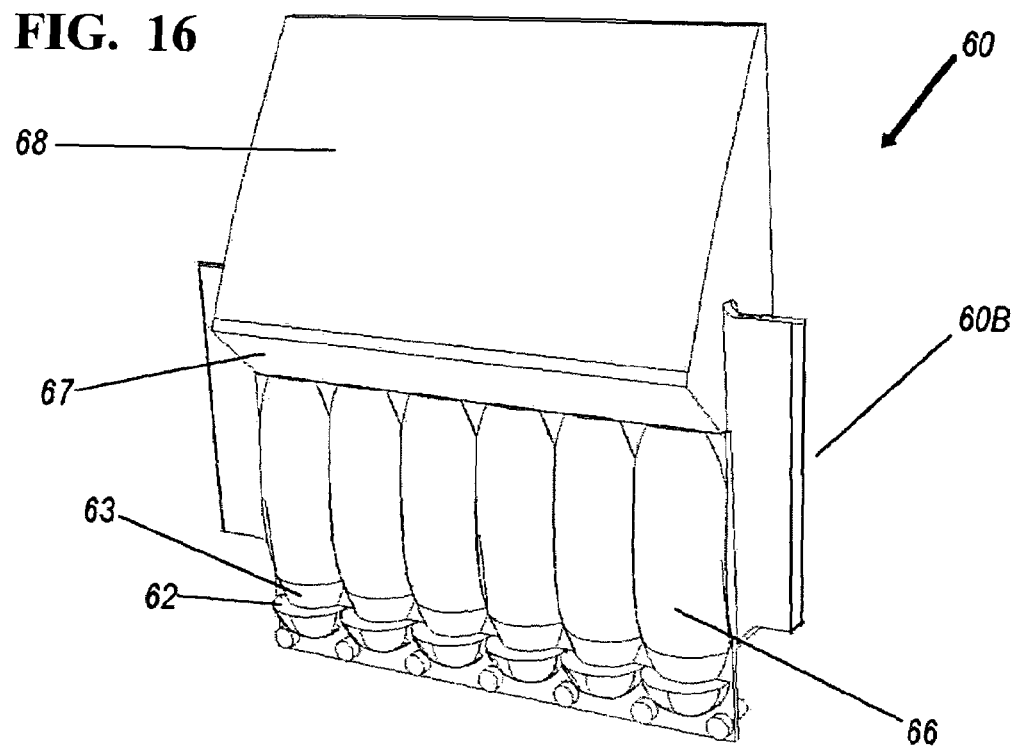
FIG. 16 is a perspective rear view of this preferred embodiment.

FIG. 16 is a perspective view of monolithic injection-molded lens 60 according to one embodiment of the present invention, which is similar to the lens shown in FIGS. 14 and 15. Lens 60 includes integral mounting brackets 60B, reimaging reflectors 62, metalized reflectors 63, fluted slightly cylindrical reflectors 66, optically inactive surface 67, and reflective surface 68.

Figure 17:
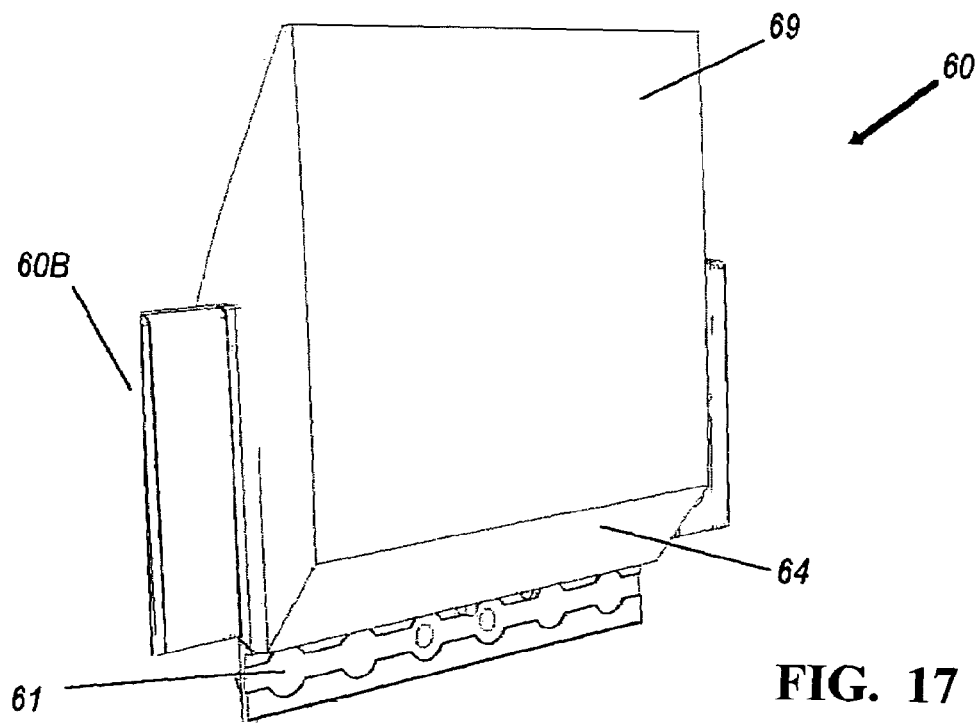
FIG. 17 is a perspective front view of this preferred embodiment.

FIG. 17 is an isometric view of monolithic injection-molded lens 60 depicting the integral mounting brackets 60B, LED-receiving cavities 61, optically inactive surface 64, and slightly cylindrical output surface 69.

Figure 18:
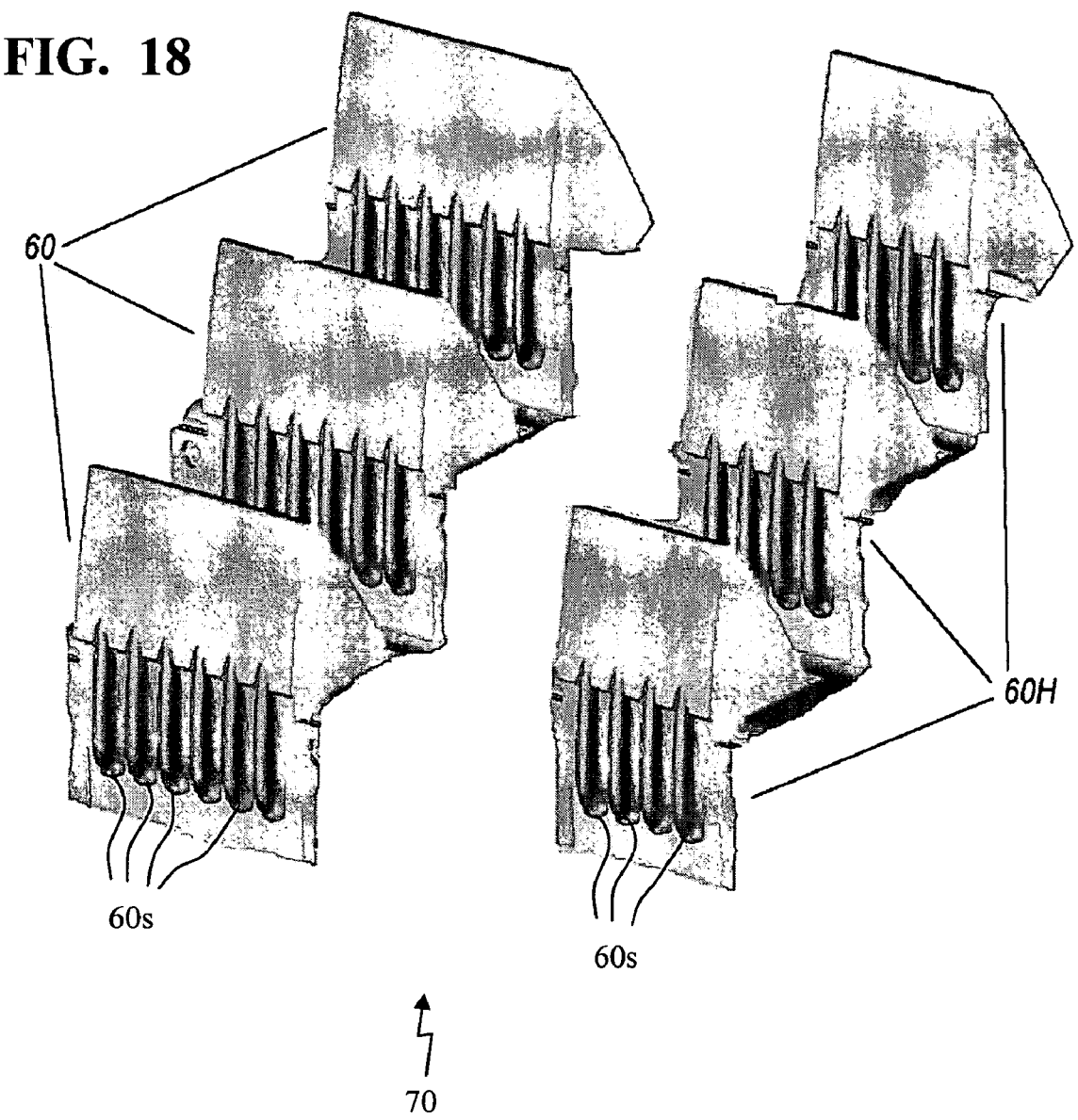
FIG. 18 is a cross section of a closely related but thicker preferred embodiment with a fluid-filled interior and one less fold in its path.

FIG. 18 is a perspective view of a bank 70 of monolithic injection molded lenses 60 that can be implemented for example with vehicle headlights, two of which can at least fulfill forward-lighting prescriptions. The bank 70 depicted in FIG. 18 comprises three low-beam luminaires 60, each having, for example, six light sources such as the LEDs 60s depicted in FIG. 16, and three matching High-Beam preferred embodiments 60H, each having, for example, four LEDs 60s as shown. A bank 70 of monolithic injection molded lenses however can include any number of luminaries depending on the desired implementation.

Figure 19:
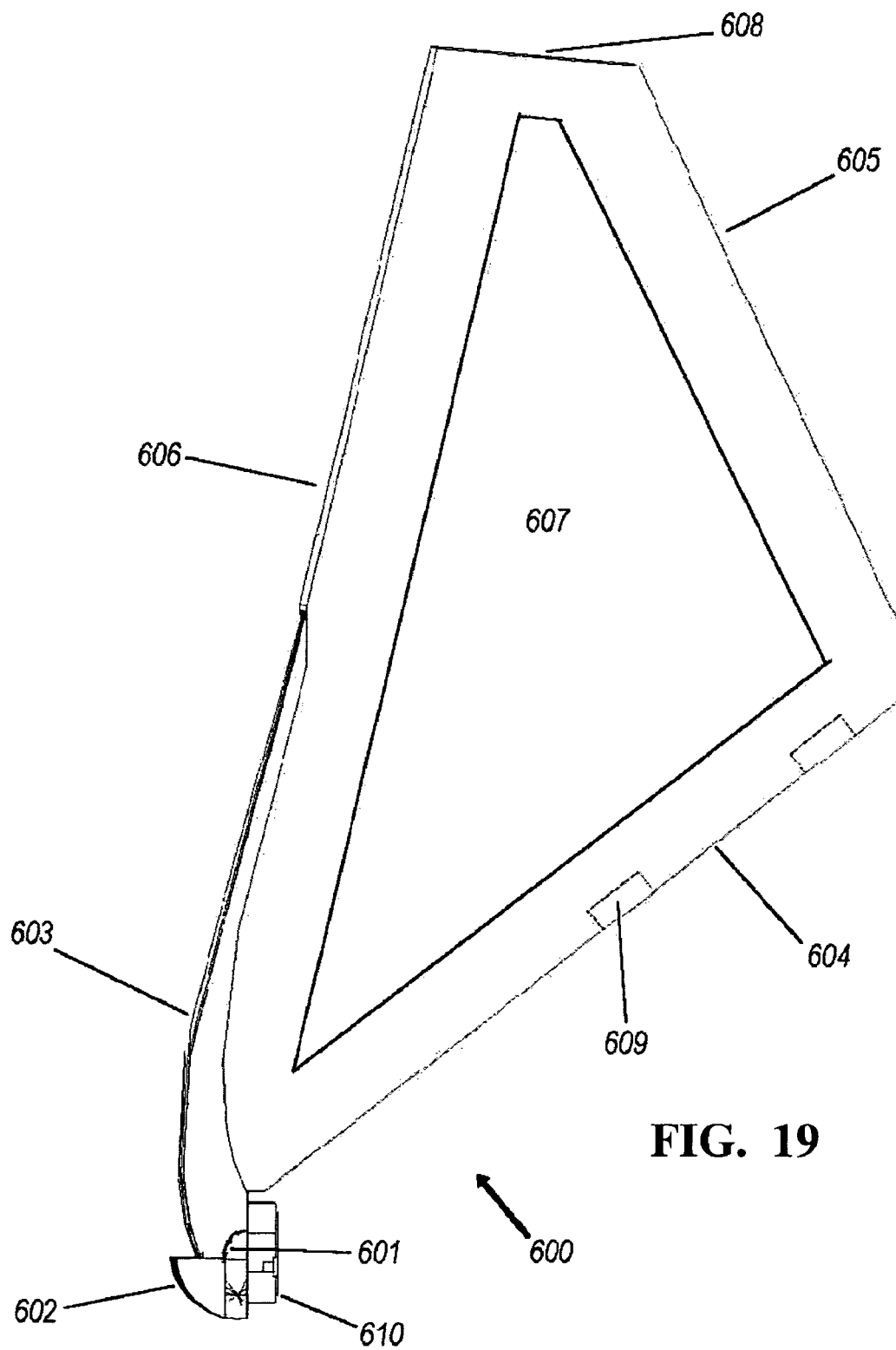
FIG. 19 is a perspective view of this preferred embodiment.
Figure 20:
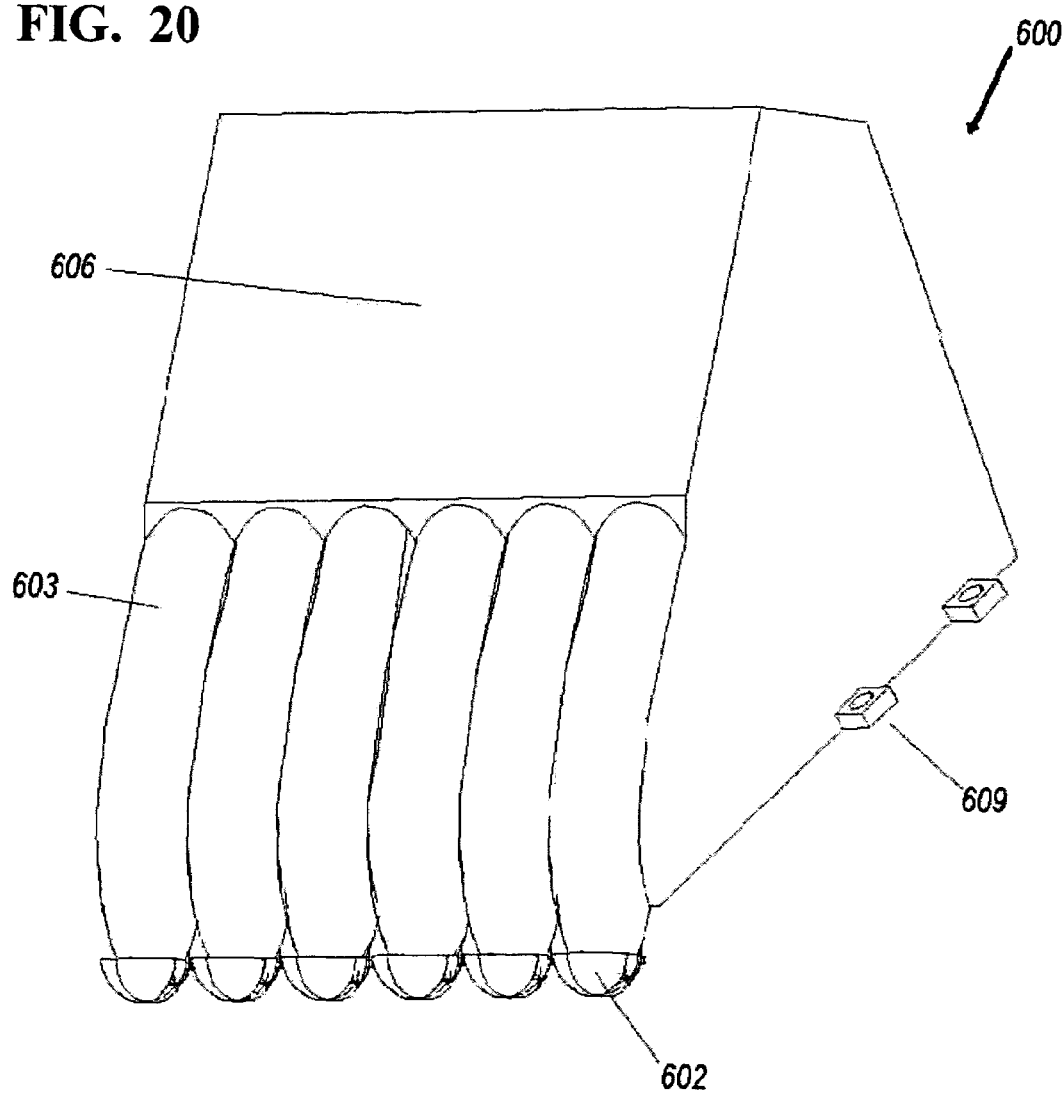
FIG. 20 depicts three pairs of low-beam and high-beam versions of this preferred embodiment, acting in concert with an identical pair to fulfill both prescriptions.

FIG. 19 and FIG. 20 depict a similar preferred embodiment for solid-state forward lighting, but with one less reflective path-fold than in FIG. 14. Monolithic injection molded lens 600 comprises hemispheric input surface 601, reimaging ellipsoid 602, reflective free-form cylindrical fingers 603, inactive planar face 604, reflectively coated planar folding face 605, planar exit face 606, inactive top face 608, and mounting tabs 609. Input surface 601 receives LED 610. Interior cavity 607 is utilized to mold such a thick part, and after molding is filled with an index-matching fluid.

Figure 21:
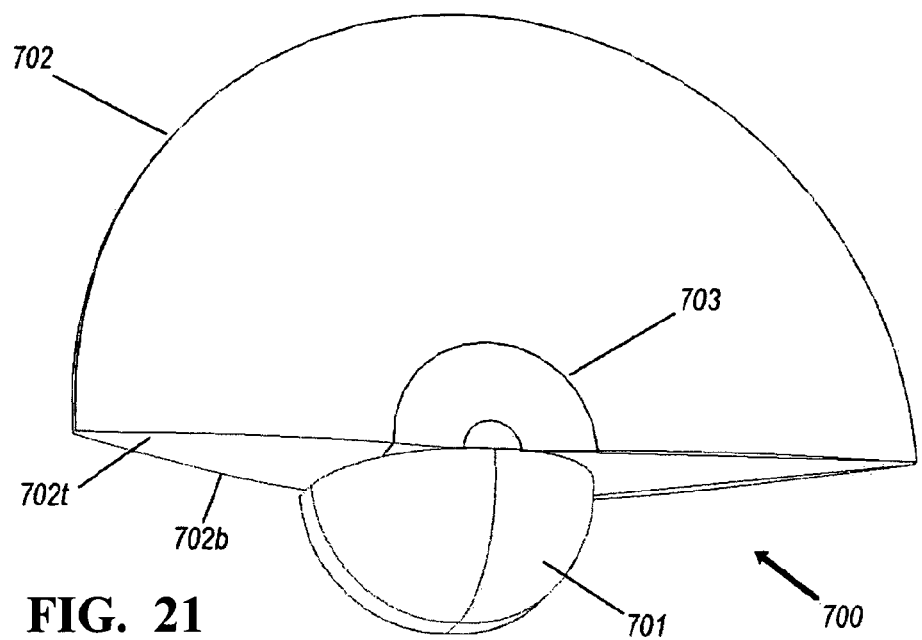
FIG. 21 is a top view of a semicircular lens with a reimaging reflector.
Figure 22:
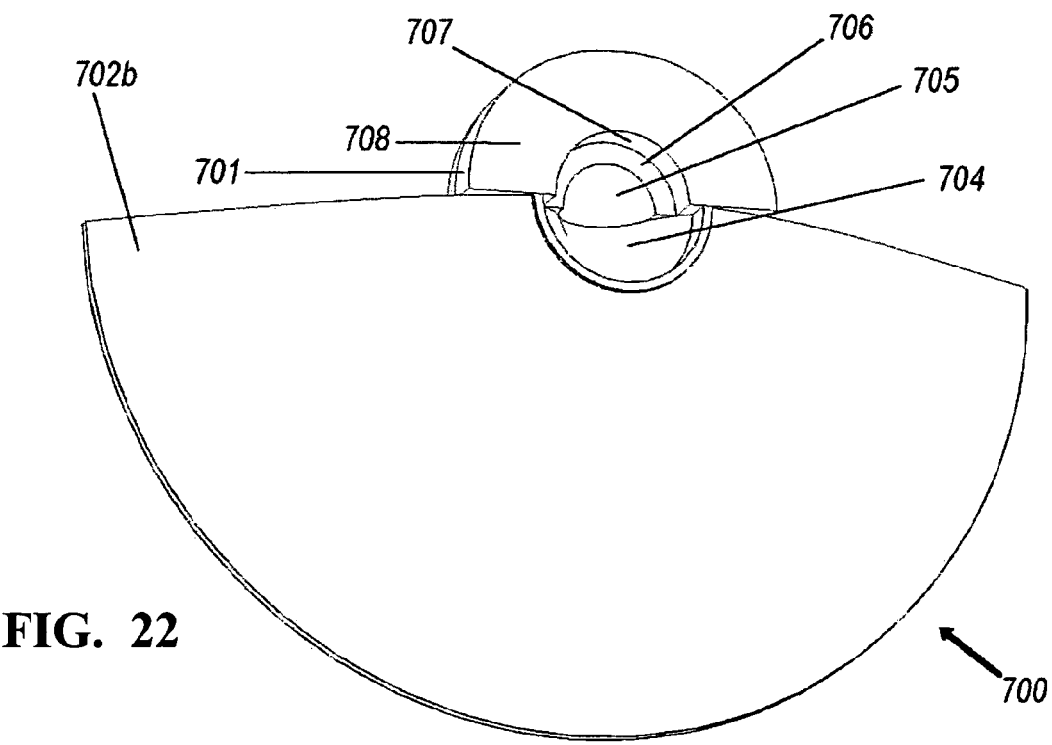
FIG. 22 is a bottom view of this lens, showing how its LED source is received.

As an example of the semicircular configuration 13 of FIG. 2, semicircular luminaire 700 is depicted in FIGS. 21-22. Top view FIG. 21 shows luminaire 700 comprising four-sector reimaging reflector 701, semicircular RXI lens 702 formed by top surface 702t and reflective bottom surface 702b, and central refractive semi-lens 703.

Bottom view FIG. 22 shows luminaire 700 further comprising free-form air-gap cavity 704 for shaping source output, semi-hemispheric cavity 705 for adhesion to a transparent LED dome, shelf 706, sidewall 707, and base 708.

Figure 23:
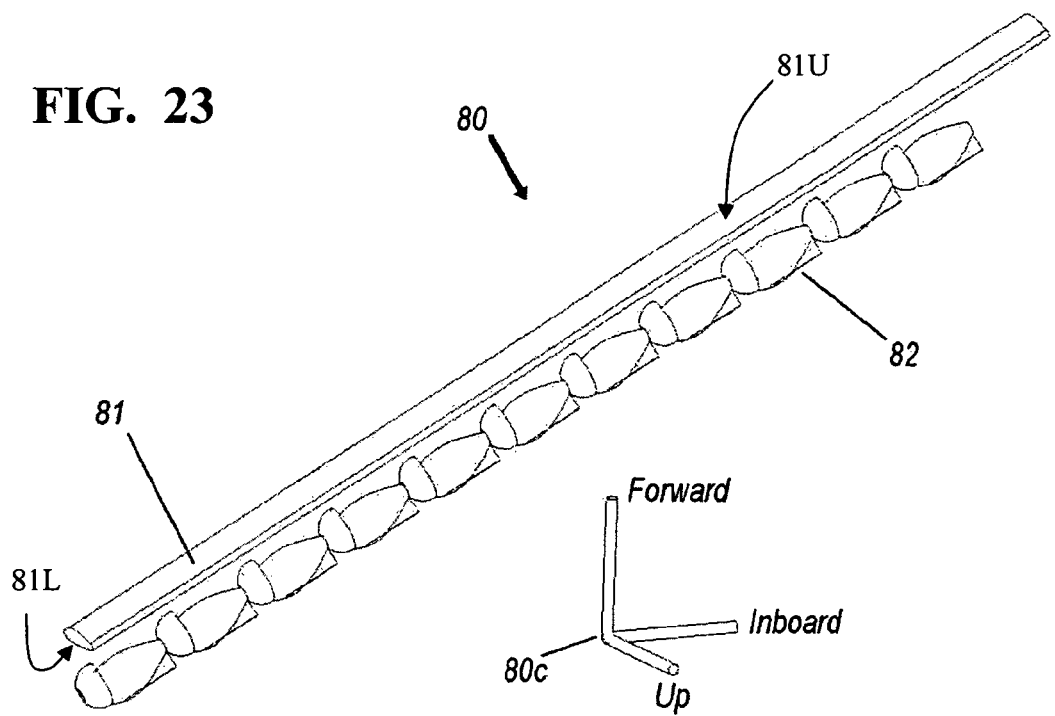
FIG. 23 depicts an off-axis forward-lighting preferred embodiment meeting a fog-lamp prescription.

A preferred embodiment fulfilling a vehicular fog lamp prescription is depicted in FIG. 23. Forward lighting system 80 comprises linear aspheric beam-shaping lens 81 and multiple lensed LEDs 82. Schematic coordinate axes 80c show lamp orientation is on a slanted front surface, indicating the off-axis capability of this preferred embodiment.

Figure 24:
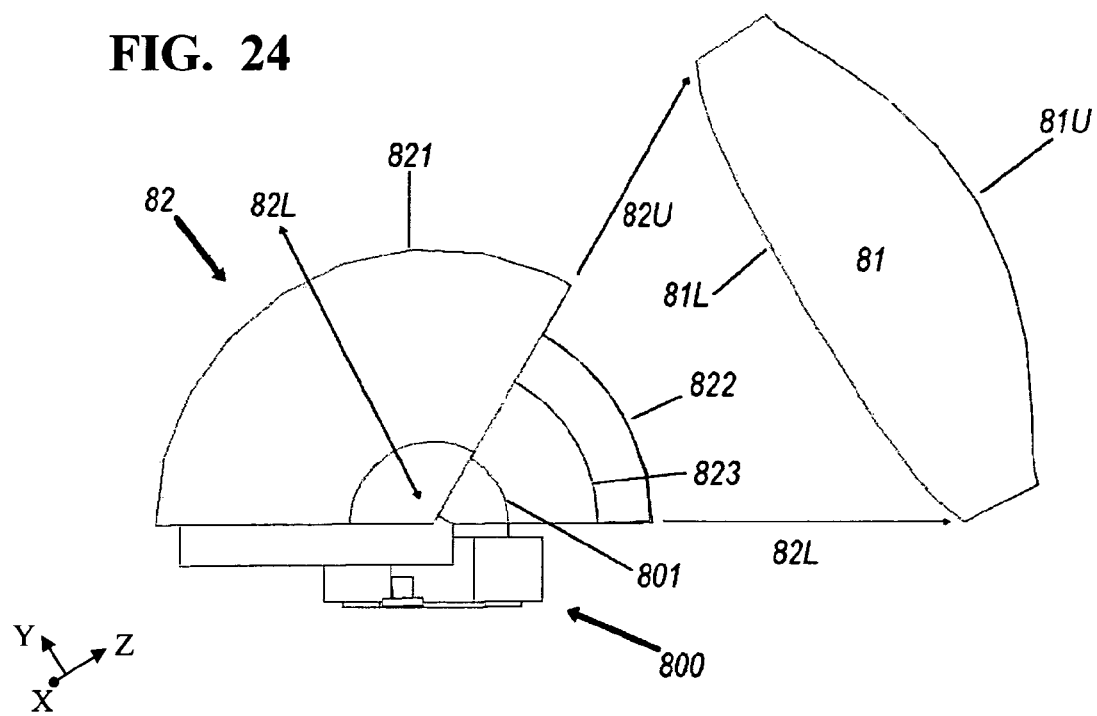
FIG. 24 is an end view of this embodiment, showing its circular symmetry and its linear lens.

FIG. 24 is an end view depicting aspheric linear lens 81, comprising outer surface 81U and inner surface 81L, intercepting the 60° ray-fan between left edge ray intercepting light between upper edge ray 82U and lower edge ray 82L, and lensed primary optic 82, comprising outer axially symmetric surface 821, outer semi-hemispheric surface 822, and interior surface of reimaging ellipsoid 823. LED dome 801 is positioned concentric with 821 and 822. Dividing line 82L functionally bisects the 120° arc of surface 821, demarcating the below-mentioned upper and lower interior reflectors, which respectively illuminate lower and upper halves of linear lens 81.

The totality of luminous effects of this multiplicity of etendue-squeezing preferred embodiments is the fulfillment of a fog-lamp prescription into a direction off the surface normal of the local vehicle surface.

Figure 25:
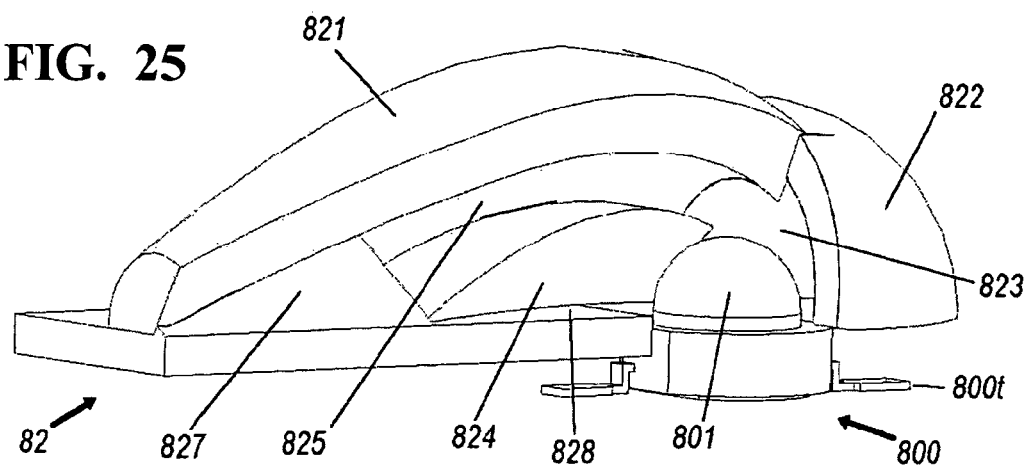
FIG. 25 is a lateral view of one lens light-source module, slightly from above.
Figure 26:
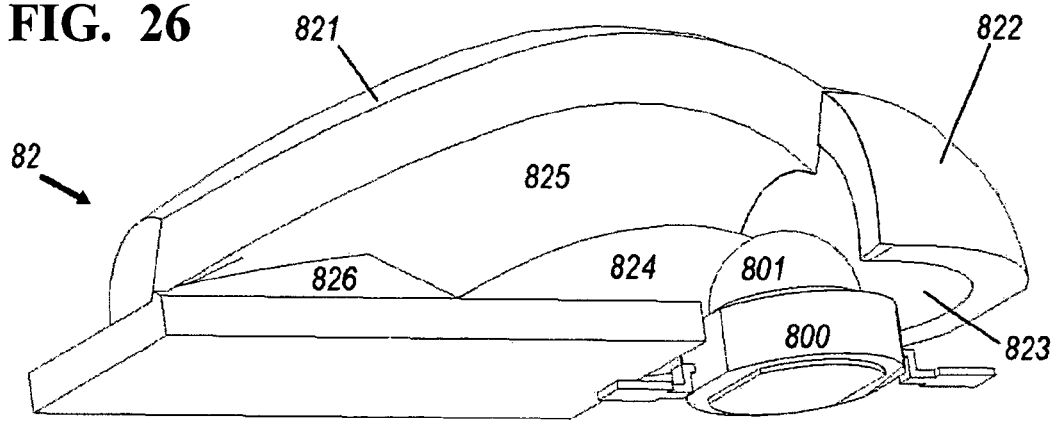
FIG. 26 is a lateral view of the same, slightly from below.

FIG. 25 and FIG. 26 are lateral views of primary optic 82, comprising outer surfaces 821 and 822, reimaging ellipsoid 823 focused at chip within dome 801 of LED package 800, lower etendue-squeezing reflector 824, and upper etendue-squeezing reflector 825 with associated 30°-tilted upper planar mirror 826.

Figure 27:
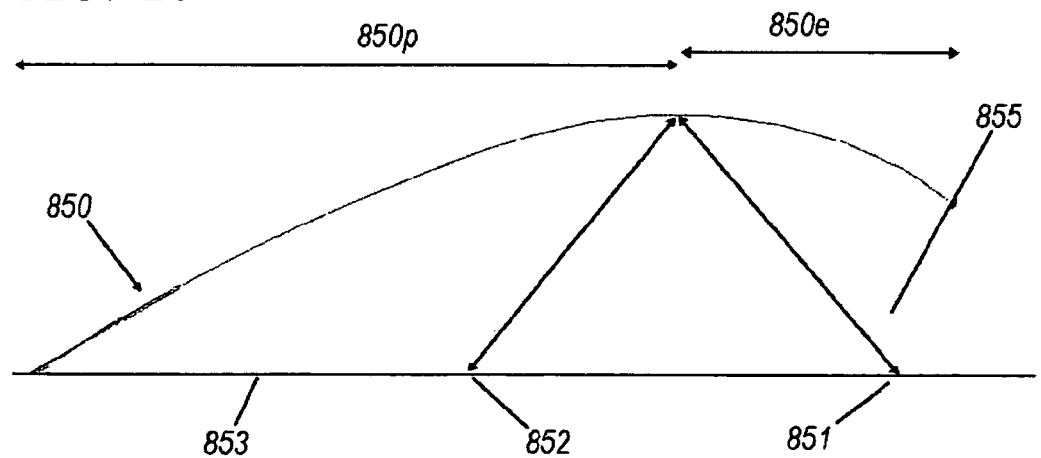
FIG. 27 is a schematic cross-section of the two reflectors depicted in FIGS. 25 and 26.

FIG. 27 shows a schematic profile illustrating the operational geometry of etendue-squeezing mirrors 824 and 825, which are surfaces of revolution of this profile, which comprises an ellipse cotangent to a confocal parabola. Profile 850 comprises parabola segment 850p and ellipse segment 850e, both with common axis of revolution 853 and meeting with the same tangent. First focus 851 is on the light-emitting chip, coincident with the primary focus of reimaging ellipsoid 823 of FIG. 26. Ellipse section 850e reimages the chip at second focus 852, on planar mirror 827 or 828. First focus 851 is also the focus of parabolic section 850p, which has inclined axis 855.

The linear lens 81 of FIG. 24 can, according to some implementations, be specified on its upper surface 81U by:

$$z = \sum_{i=0}^{n} a_n \cdot y,$$

which can be defined according to the following forty enumerated coefficients.

| | |
|---|---|
| $a_0$ | 23.7323461896680357 |
| $a_1$ | -2.35756210296816437 |
| $a_2$ | 1.62726704588258642 |
| $a_3$ | -0.716661159390062252 |
| $a_4$ | 0.230627519895498456 |
| $a_5$ | -0.0564977755152250571 |
| $a_6$ | 0.0101731514516384385 |
| $a_7$ | -0.00123530871192474557 |
| $a_8$ | 8.22806412403507132e-05 |
| $a_9$ | 8.2636979882550525e-08 |
| $a_{10}$ | -5.1692174132151874e-07 |
| $a_{11}$ | 4.34660979003263823e-08 |
| $a_{12}$ | -1.94731619467607768e-09 |
| $a_{13}$ | 1.04274639743941907e-10 |
| $a_{14}$ | -7.67061191589676232e-12 |
| $a_{15}$ | 3.60046020675626574e-13 |
| $a_{16}$ | -9.75636966897008181e-15 |
| $a_{17}$ | 2.5732999229083607.9e-16 |
| $a_{18}$ | -1.17974640217786435e-17 |
| $a_{19}$ | 8.74556046777561242e-19 |
| $a_{20}$ | -5.42971511106852066e-20 |
| $a_{21}$ | 4.81286126939681239e-21 |
| $a_{22}$ | -3.44029477543583054e-22 |
| $a_{23}$ | 1.66258036297390458e-24 |
| $a_{24}$ | 1.35676812793622248e-25 |
| $a_{25}$ | 6.17139635634764269e-26 |
| $a_{26}$ | -2.99632515535625432e-27 |
| $a_{27}$ | 2.56147058170827249e-29 |
| $a_{28}$ | -4.21504584477108204e-30 |
| $a_{29}$ | 2.78590988668004316e-31 |
| $a_{30}$ | -2.99571633535578293e-33 |
| $a_{31}$ | 2.68809672210511845e-34 |
| $a_{32}$ | -3.85311166574406139e-35 |
| $a_{33}$ | 9.68114003166518218e-37 |
| $a_{34}$ | -4.638252512241093e-38 |
| $a_{35}$ | 9.37651641899118408e-39 |
| $a_{36}$ | -2.92030037424059245e-40 |
| $a_{37}$ | -1.17243288653282526e-41 |
| $a_{38}$ | 3.60867110660494119e-43 |
| $a_{39}$ | 1.51578486617199042e-44 |
| $a_{40}$ | -4.46533565034798503e-46 |

The lower surface 81L can be defined according to one implementation by:

$$z = \sum_{i=0}^{n} b_n \cdot y,$$

which can be defined according to the following forty enumerated coefficients.

| | |
|---|---|
| $b_0$ | 19.6299091524472828 |
| $b_1$ | -1.57277089370702794 |
| $b_2$ | 0.554983044885405619 |
| $b_3$ | -0.240472306798358959 |
| $b_4$ | 0.0737927033665797261 |
| $b_5$ | -0.0152046436738344417 |
| $b_6$ | 0.00196793313140879037 |
| $b_7$ | -0.000132060182759310458 |
| $b_8$ | -1.98011048767264361e-07 |
| $b_9$ | 6.62443944313761817e-07 |
| $b_{10}$ | -2.46249819372499411e-08 |
| $b_{11}$ | -2.11842097765186506e-09 |
| $b_{12}$ | 1.70083704559306457e-10 |
| $b_{13}$ | -2.41773961950242511e-12 |
| $b_{14}$ | 7.60192304332669464e-14 |
| $b_{15}$ | -8.3619247479718772e-15 |
| $b_{16}$ | -1.12275996810063414e-16 |
| $b_{17}$ | -1.70125051352445508e-17 |
| $b_{18}$ | 7.55096542652264318e-19 |
| $b_{19}$ | 1.72224335764688652e-19 |
| $b_{20}$ | 3.3869990475210065e-21 |
| $b_{21}$ | -8.76634599954845472e-22 |
| $b_{22}$ | 2.67590881265907127e-24 |
| $b_{23}$ | -7.04240087666460112e-25 |
| $b_{24}$ | 1.3825053029168974e-25 |
| $b_{25}$ | -2.04243983423132075e-27 |
| $b_{26}$ | -2.3917673643133041e-28 |
| $b_{27}$ | 2.41616030487243679e-29 |
| $b_{28}$ | 2.24389533033019912e-31 |
| $b_{29}$ | -5.36319627700969682e-32 |
| $b_{30}$ | -2.26856806324107915e-33 |
| $b_{31}$ | -1.17597262150234576e-34 |
| $b_{32}$ | 1.76818189483146931e-36 |
| $b_{33}$ | 1.09431265893002939e-36 |
| $b_{34}$ | 1.53367733581741235e-38 |
| $b_{35}$ | 9.50032297431148229e-40 |
| $b_{36}$ | -2.99988743265351054e-40 |
| $b_{37}$ | 2.91117469243712755e-42 |
| $b_{38}$ | -1.27191927772221192e-43 |
| $b_{39}$ | 3.6206737915041727e-44 |
| $b_{40}$ | -9.68629343022934038e-46 |

In stand-alone preferred embodiments, a smaller injection-molded configuration surrounds the chip-on-board LED source, comprising a reimaging reflector and a free-form surface shaped to produce a wide-angle pattern tailored for injection through the intervening air or other medium to an adjacent beam-forming luminaire. Preferred embodiments employ decentered installation of their light sources, in the manner depicted in FIGS. 2-4. An etendue-squeezing reflector is employed to redirect source-light into the solid angle subtended by the luminaire.

Figure 28:
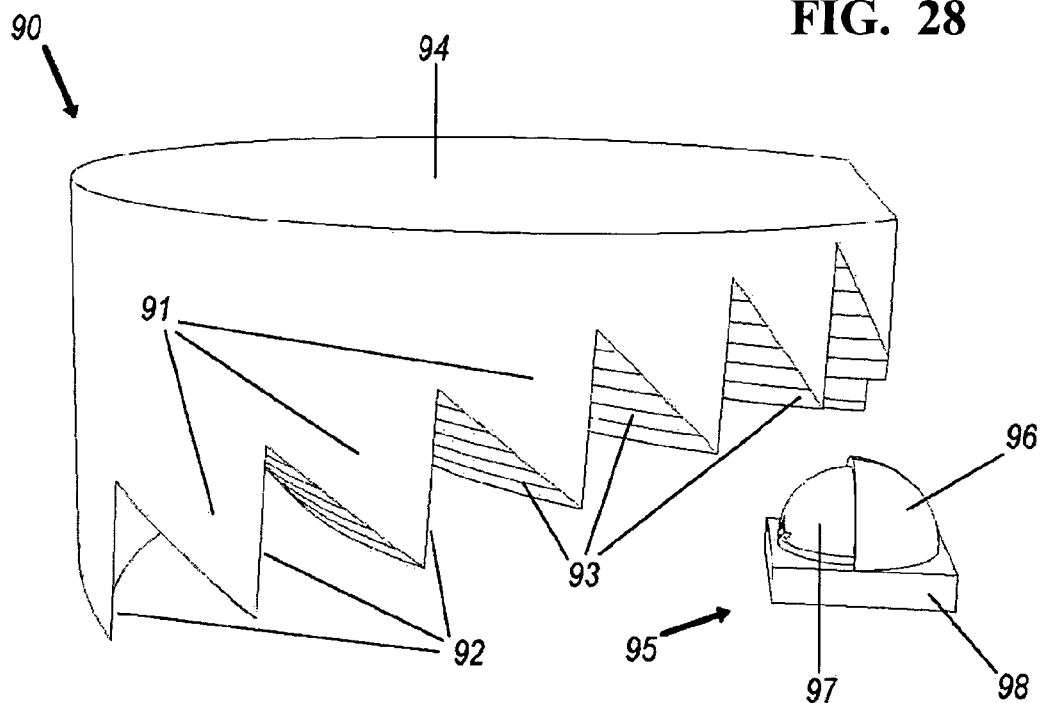
FIGS. 28-30 depict a decentered circular TIR lens with an etendue-squeezed light source.
Figure 29:
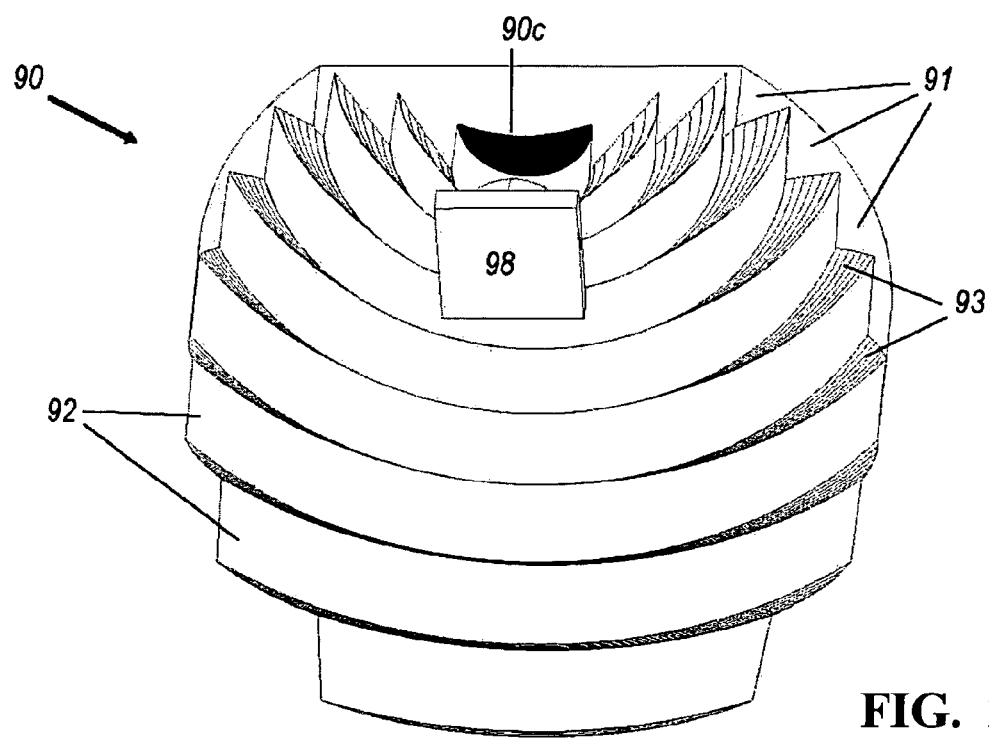
Figure 30:
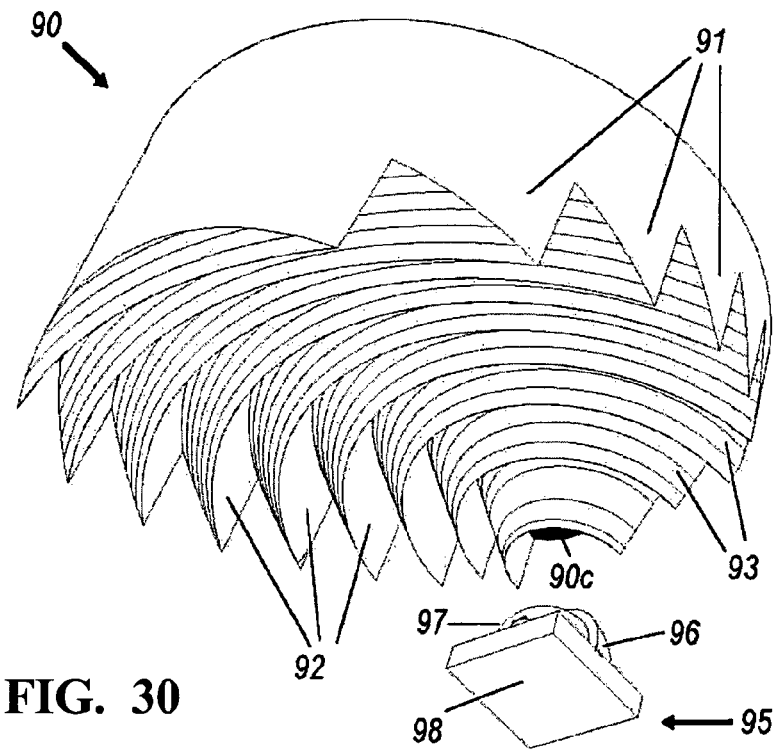

FIGS. 28, 29, and 30 show a side view, an elevation view from below and a lateral view from below, respectively, of decentered circular totally internally reflecting (TIR) lens 90 and stand-alone light source 95. TIR lens 90 is formed from a complete circular TIR lens as a cutout generally circular section half the original diameter, with one edge at the circle's center and the other at its periphery. Decentered lens 90 includes central refractive lens 90c, grooved facets 91 with entry faces 92 to receive light and totally internally reflecting faces 93 to redirect upwards to exit through circular top face 94. Light source 95 comprises metalized reimaging reflector 96 which can be similar to reimaging reflectors of FIGS. 3-4, tailored free-form exit face 97, and base 98 configured to produce an etendue-squeezed output beam that is directed towards the TIR lens 90.

Figure 31:
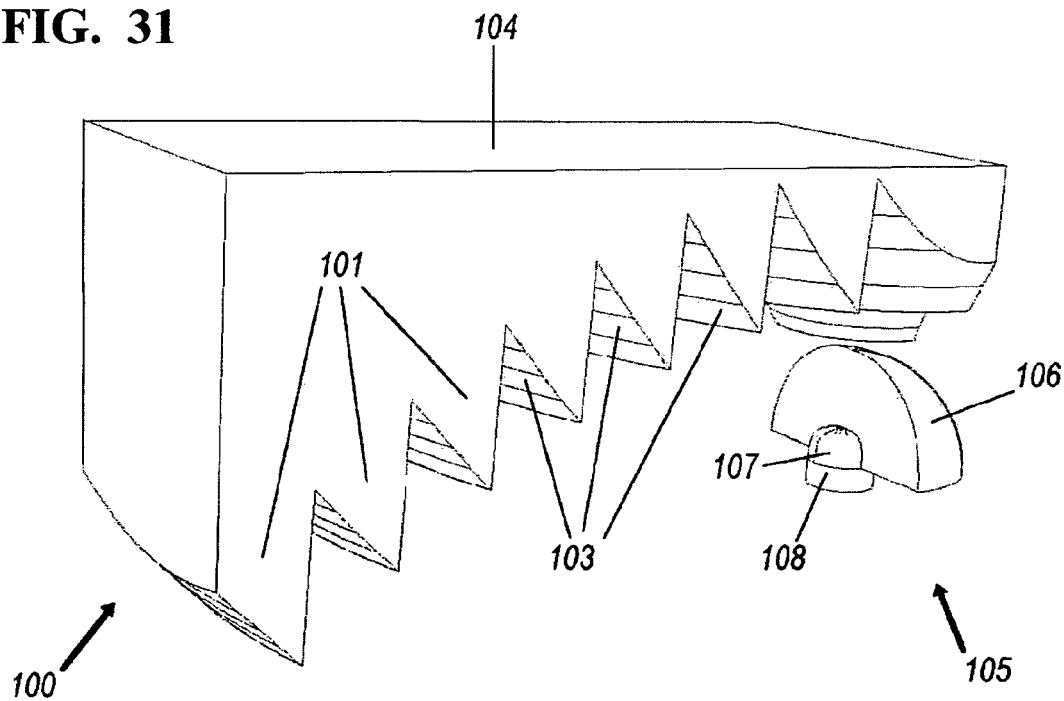
FIGS. 31-33 depict a decentered rectangular TIR lens with an etendue-squeezed light source.
Figure 32:
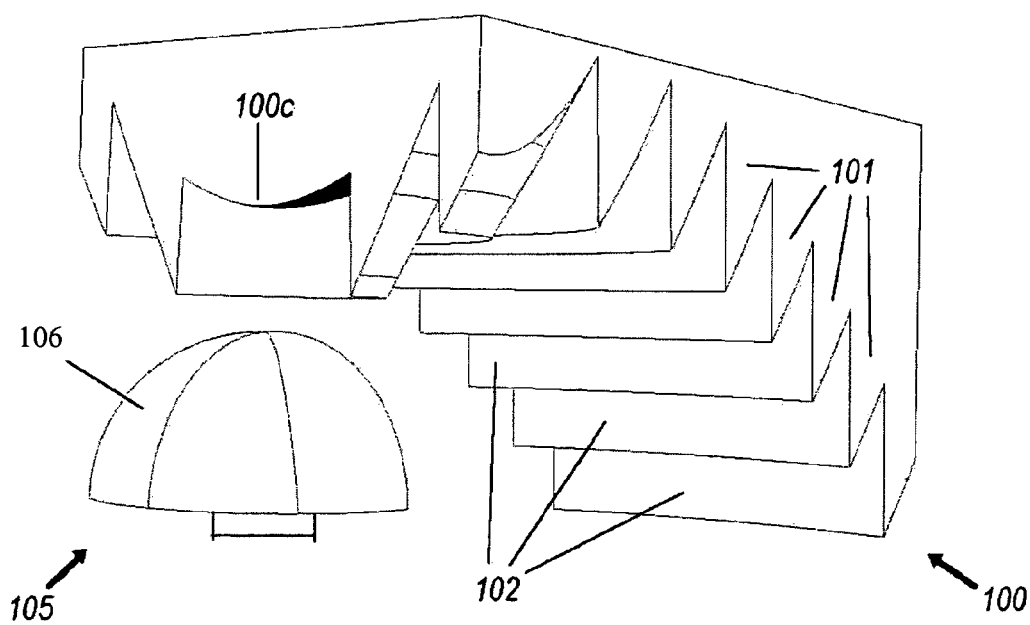
Figure 33:
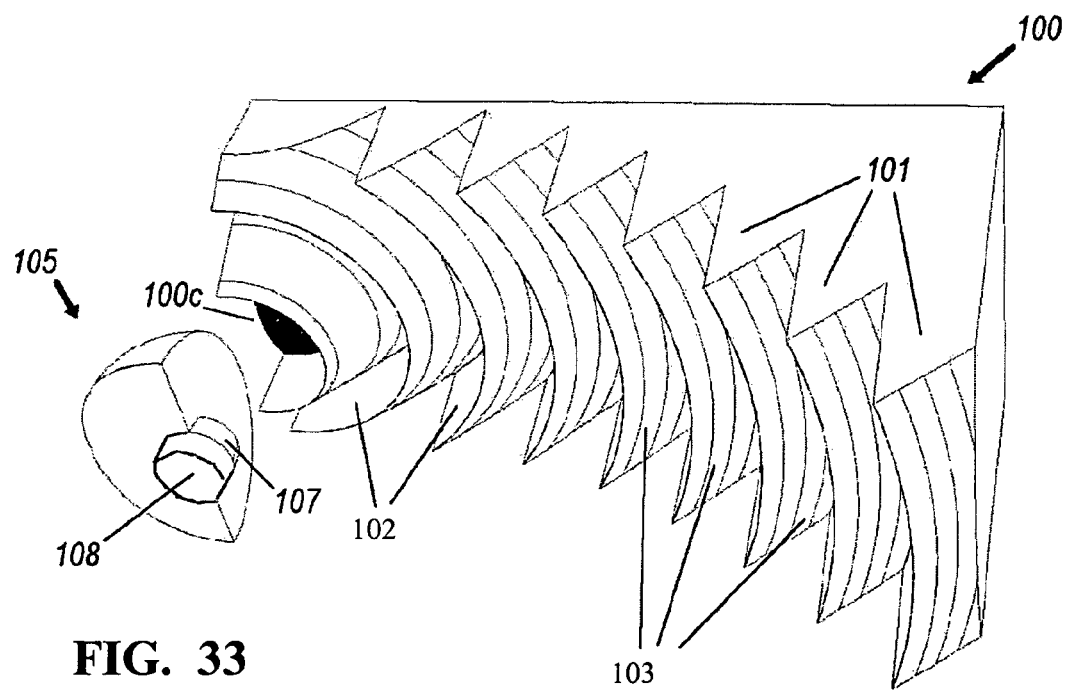

FIG. 31, FIG. 32, and FIG. 33 show different views of decentered, generally rectangular TIR lens 100 and stand-alone light source 105 according to one embodiment of the present invention. The rectangular shape is useful in many different applications, for example in vehicular styling of lamps meeting prescription for fog lamps. TIR lens 100 can be formed in some embodiments according to a complete circular TIR lens and configuration as a rectangular section of length with dimensions that extend from center to edge of the circular TIR lens configuration. Decentered rectangular lens 100 includes central refractive lens 100c, grooved facets 101 with entry faces 102 to receive light and totally internally reflecting faces 103 to redirect upwards to exit through rectangular top face 104. Light source 105 includes metalized reimaging reflector 106, tailored free-form exit face 107, and base 108.

Figure 34:
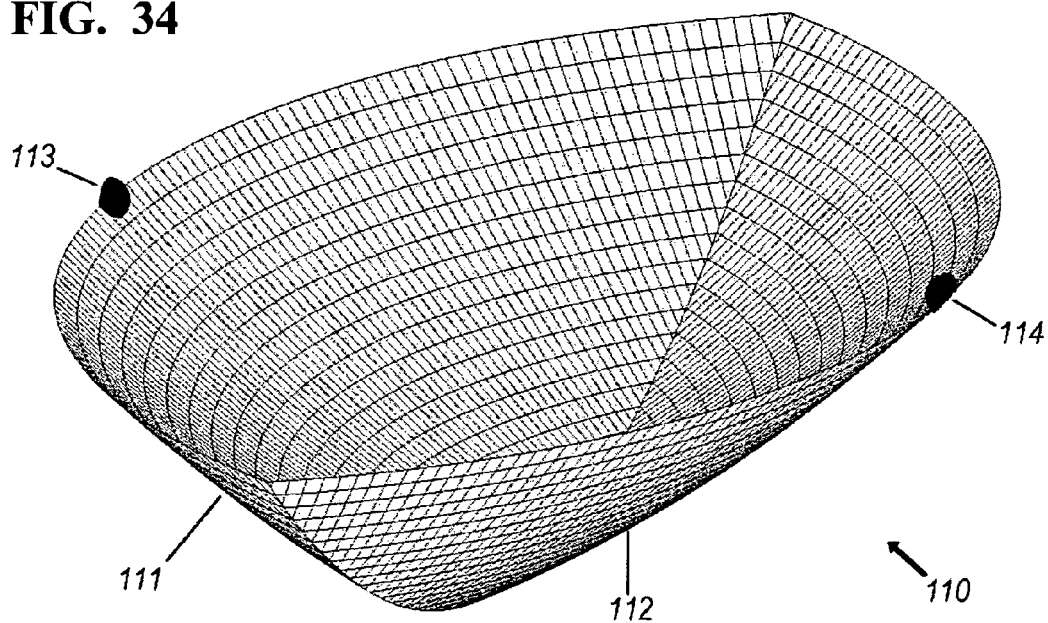
FIG. 34 depicts a two-sector boat-shaped luminaire.
Figure 35:
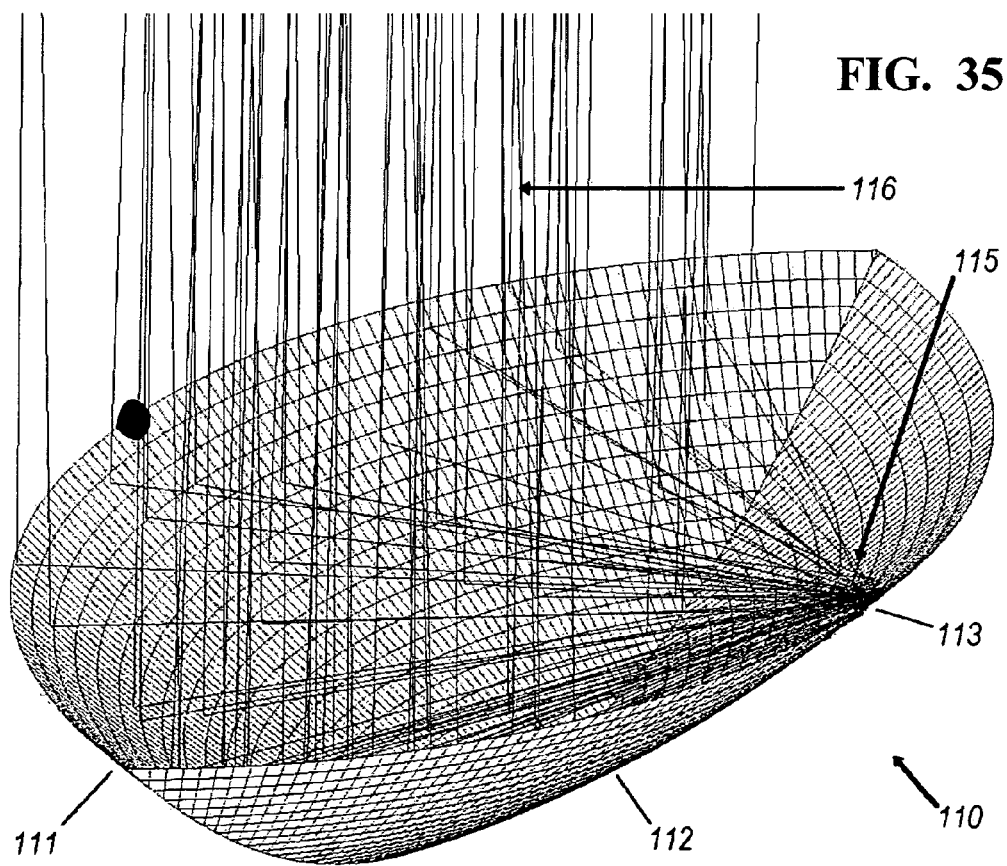
FIG. 35 depicts the collimating action of one sector of the luminaire of FIG. 34.

FIGS. 34 and 35 depict simplified schematic diagrams of a luminaire or reflector 110 according to one embodiment that utilizes light sources 113 and 114 that employ etendue squeezing. Generally boat-shaped luminaire 110 includes a first or left-half paraboloidal reflector 111, a second or right-half paraboloidal reflector 112, a first light source 113, which illuminates the surface of right-half reflector 112 from a position about its focal point, and light source 114, which illuminates the surface of reflector 111 from a position about the focal point of reflector 111.

In previous devices, a conventional circular paraboloidal mirror with a central source has the disadvantage in that the central portions of the reflector are positioned quite close to the light source and therefore tend to produce beamlets much wider than most of the beam, wastefully producing a probably useless dim fringe extending around the main beam.

Alternatively in one preferred embodiment of boat-shaped luminaire 110, light sources 113 and 114 are positioned at a distance or removed from their corresponding reflectors (112 and 111, respectively) and thus substantially avoid producing such wasteful wide-angle beamlets. Some present embodiments utilize light sources 113 and 114 that employ etendue squeezing. The etendue squeezing, as described above, limits the direction of emitted light from each source towards its corresponding reflector. Such an arrangement avoids the production of wasted light being emitted from the sources in directions away from the reflectors 111, 112. This etendue squeezing is illustrated in FIG. 35, depicting examples of some rays 115 emitted by the first source 113 and redirected by the corresponding first reflector 111 into a beam 116, which in some embodiments can be a collimated beam.

High flux-utilization includes the efficient optical coupling of an LED-chip's hemispheric emission to the paraboloidal sector focused upon it. For a beam meeting forward-lighting prescriptions and particularly their rapid vertical cutoffs, etendue squeezing enables overall device size to be minimized, by giving up rapid horizontal cutoffs. Thus a combination of reimaging reflector and free-form tailored lens sends the appropriate local-intensity pattern for input to its paraboloidal-sector reflector. This squeezing is illustrated in FIG. 35, depicting rays 115 emitted by source-luminaire 113 and thence redirected by reflector 111 into elongated collimated beam 116.

Figure 36:
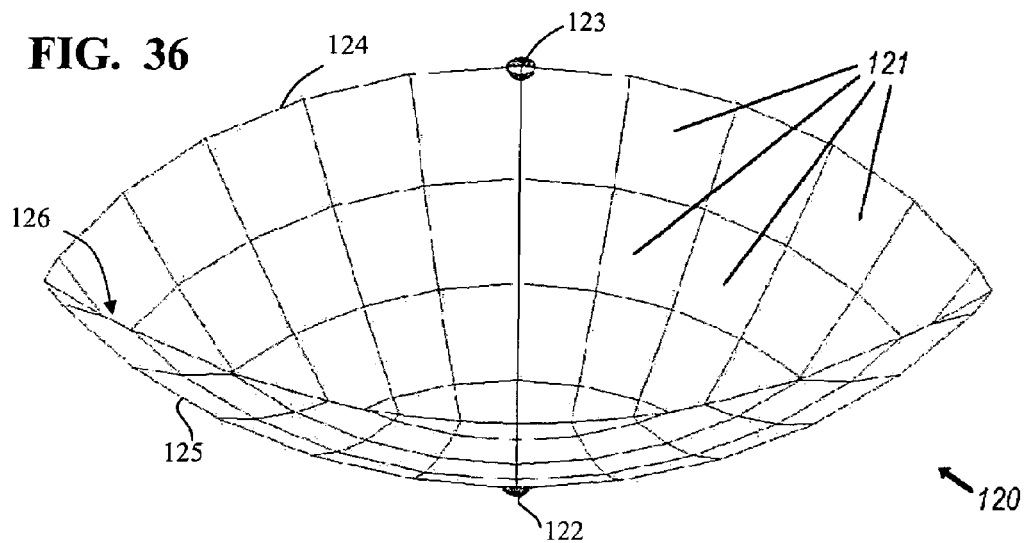
FIG. 36 shows a faceted version of FIG. 34.

Additional degrees of optical-design freedom are available when utilizing sources with etendue squeezed output to satisfy the complexities of a forward-lighting prescription. FIG. 36 depicts a slanted side view into the interior of boat-shaped reflector 120 with facets 121, which deviate in small amounts from the paraboloidal shape of FIGS. 34 and 35 in order to reshape its narrow collimated beam into one meeting a forward-lighting prescription. Source luminaires 122 and 123 illuminate their corresponding reflective sectors 124 and 125, respectively. Bottom seam or fold-line 126 is darkened for emphasis.

Figure 37:
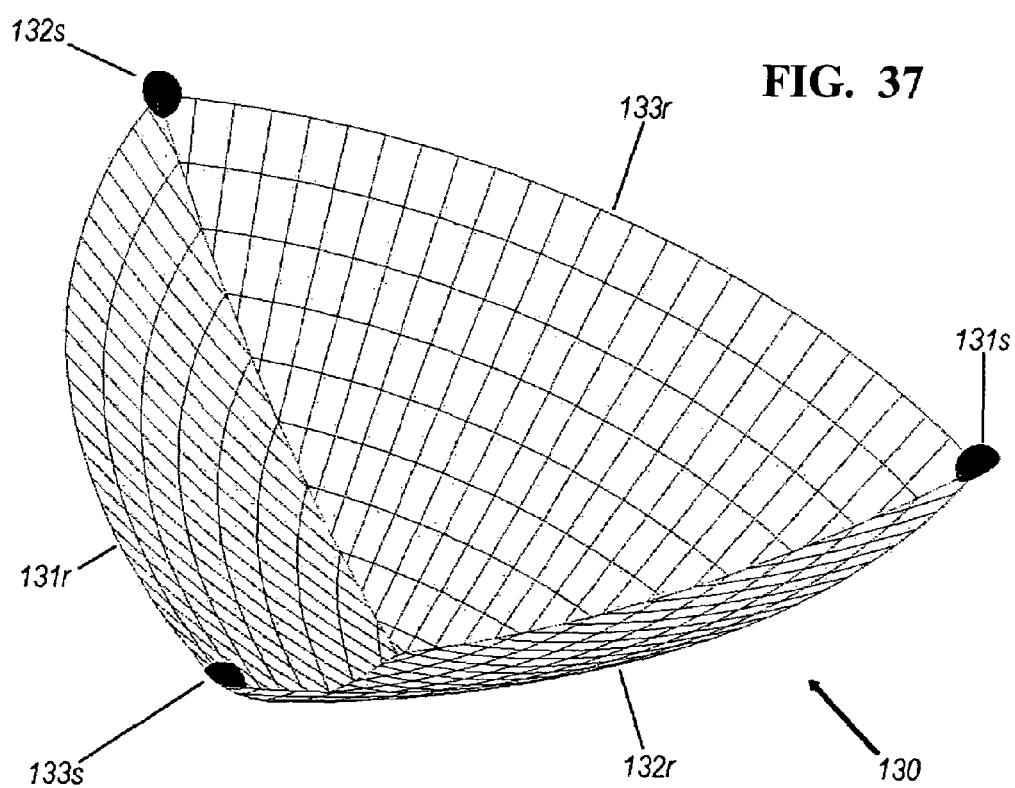
FIG. 37 shows a trisymmetric version of FIG. 34.

FIG. 37 depicts a preferred embodiment with triangular symmetry. Luminaire 130 comprises paraboloidal-reflector segment 131r and corresponding source 131s, segments 132r and 133r and corresponding sources 132s and 133s. Preferred embodiments with an odd-fold symmetry would have their sources located on the intersections of reflector segments.

Figure 38:
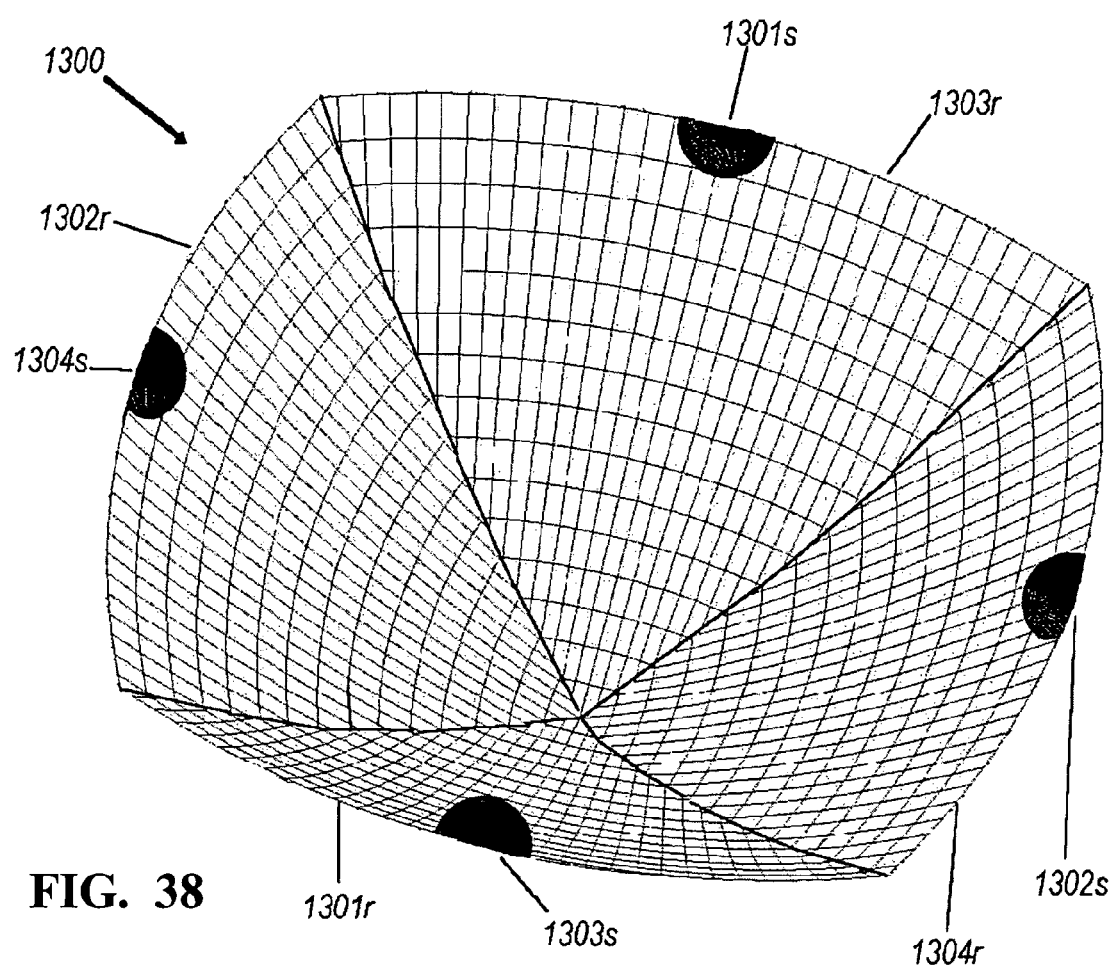
FIG. 38 shows a quadrisymmetric version of FIG. 34.

FIG. 38 depicts preferred embodiment 1300 with quadrilateral symmetry. Source 1301s illuminates opposing paraboloidal segment 1301r, and the same for sources 1302s, 1303s, and 1304s and reflector segments 1302r, 1303r, and 1304r, respectively. These reflector segments could be specialized in various horizontal and vertical aspects of meeting a forward-lighting prescription. Preferred embodiments with an even-fold symmetry would have their sources at the middle of opposing reflector segments.

Figure 39:
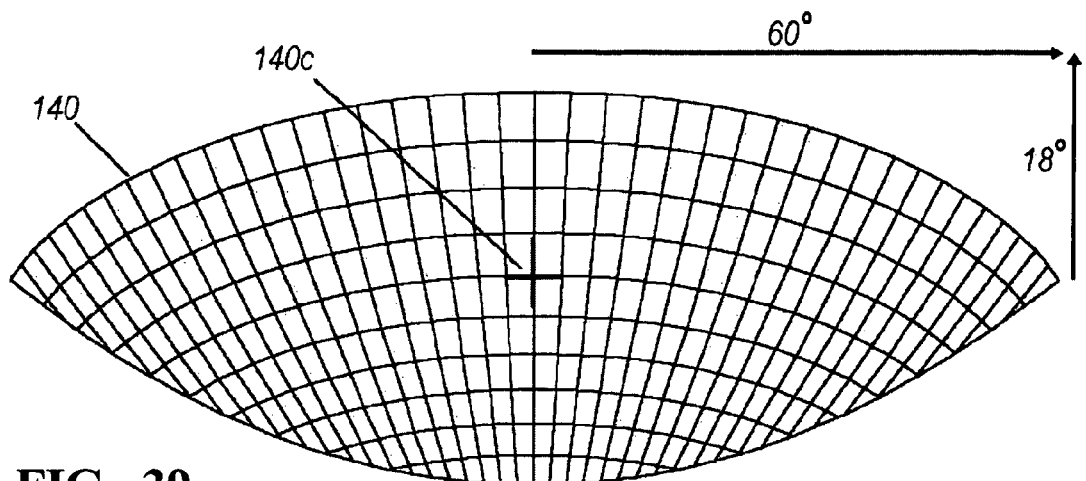
FIG. 39 is the deflection diagram for a source of FIG. 34.
Figure 40:
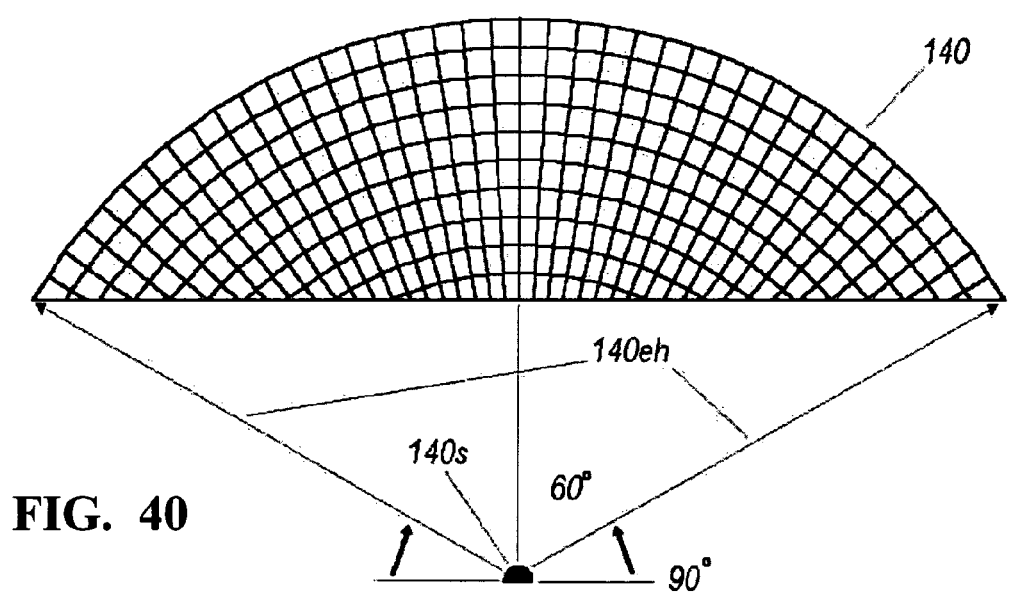
FIG. 40 depicts the deflection diagram similar to that of FIG. 39 demonstrating horizontal limit-angles.

The light sources indicated in FIG. 36 and FIGS. 37-38 have free-form lensing appropriate to the solid angle subtended by their corresponding reflector segments. In order to understand this free-form geometry, FIG. 39 is a deflection diagram depicting the solid angle subtended by paraboloidal sector 140 as seen from source 140s (see FIG. 41), analogous to the reflector sectors of FIGS. 34-35. Source-view FIG. 39 shows the position of centroid 140c of the solid angle subtended by reflector sector 140. Its angular semi-dimensions of 60° horizontal and 18° vertical are respectively established in top view FIG. 40 by horizontal edge rays 140eh and in FIG. 41 by vertical edge rays 140ev. FIG. 40 shows that horizontal edge rays 140eh involve an inward 30° deflection of the ±90° limiting rays coming from a virtual source similar to that formed in FIG. 8. This 30° deflection can be done by a single refraction. Lateral view FIG. 41 shows that the ±18° vertical edge rays 140ev are within 27° of the ±45° vertical limits of a virtual source similar to that formed in FIG. 8, so that the entire deflection diagram of FIG. 39 can be accomplished refractively, as will be shown next.

Figure 42:
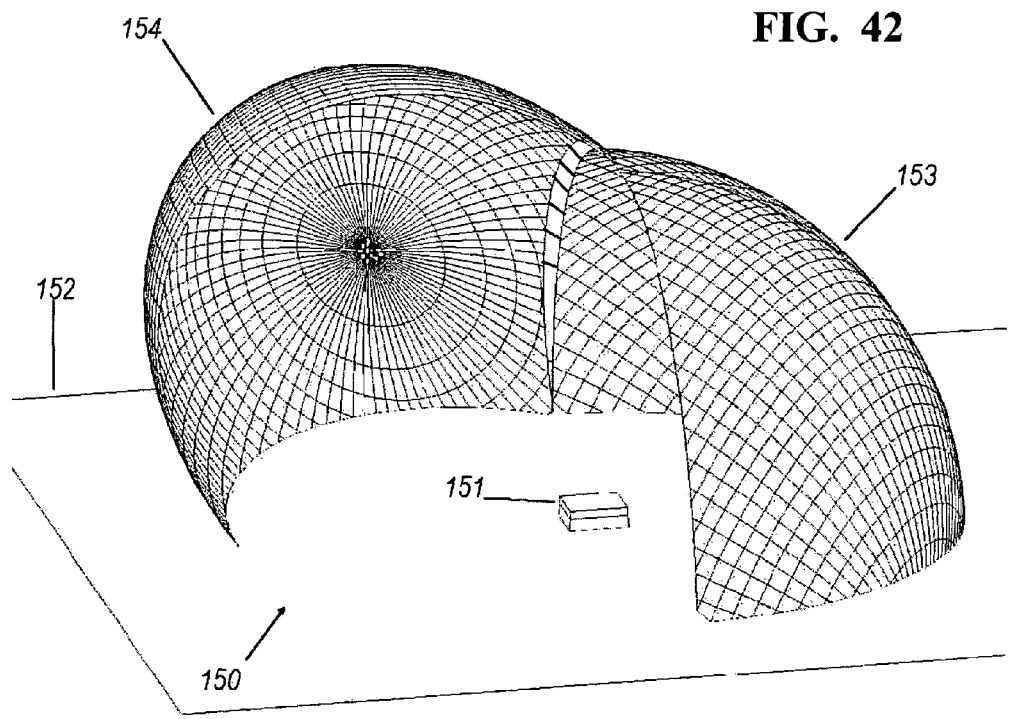
FIG. 42 is a cutaway of the source of FIG. 34.
Figure 43:
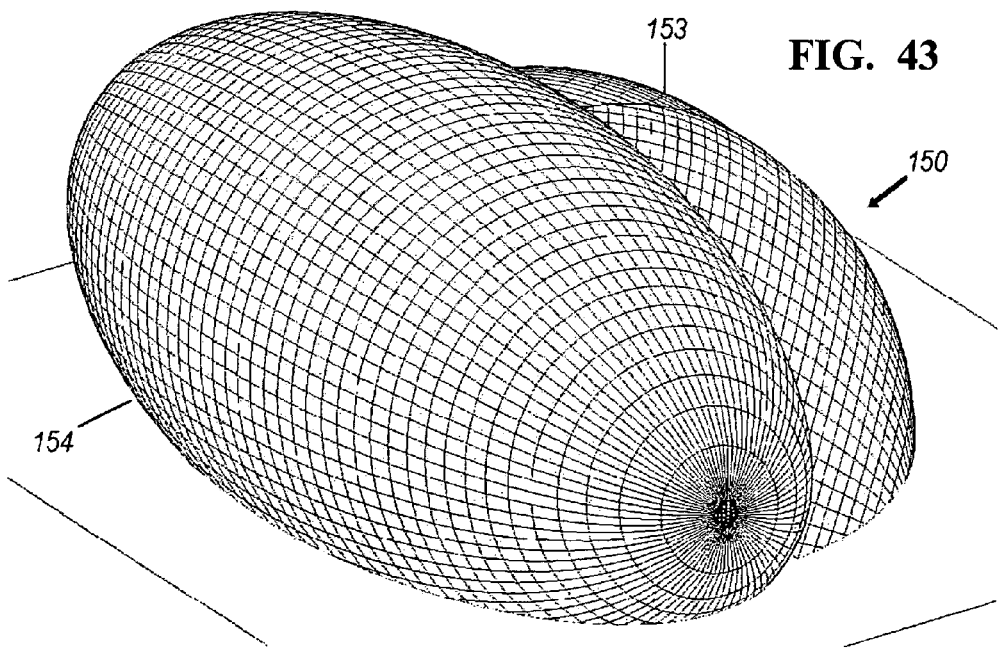
FIG. 43 shows the entire free-form lens of FIG. 42 without cutaway.

FIGS. 42 and 43 depict views of luminaire 150 comprising LED chip 151, mirrored base 152, two-sector reimaging reflector 153, and free-form refractive lens 154 in cutaway in FIG. 42. Lens 154 compresses the luminous output of the virtual source, formed by reflector 153, into the solid angle of FIG. 39.

Figure 41:
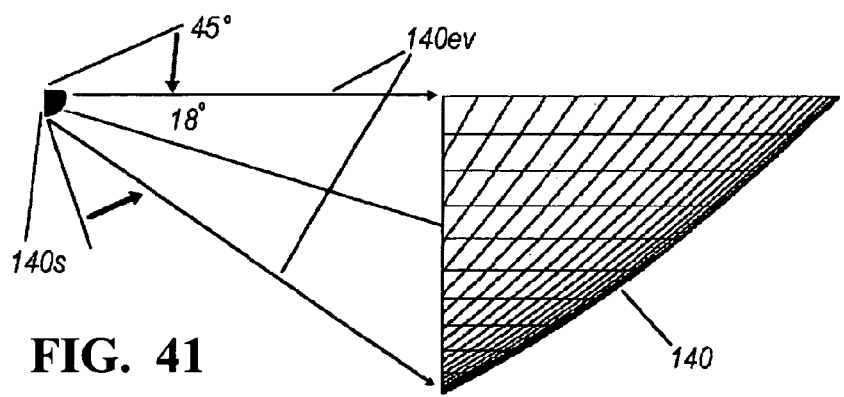
FIG. 41 depicts the deflection diagram similar to that of FIGS. 39 and 40 showing vertical limit-angles.

The principal difference between a paraboloidal versus a TIR-lens deployment is that the TIR lens version utilizes the upright orientation shown in FIGS. 39-41, while the reflector has an upside-down attitude, shining down into its reflector segment.

Figure 44:
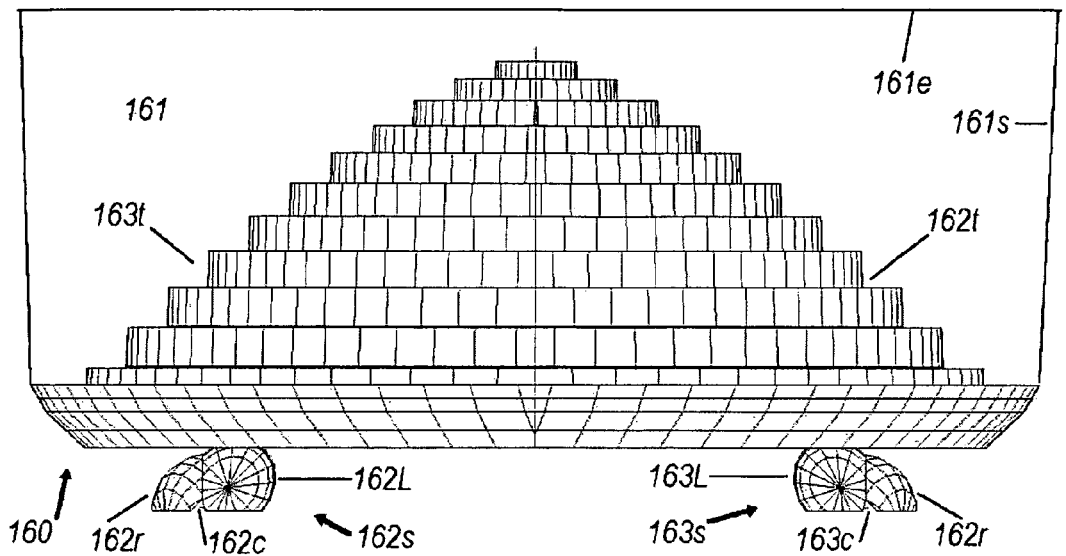
FIG. 44 shows a semi-transparent end view of the TIR boat lens with optical sources similar to the sources depicted in FIGS. 42-43.

FIG. 44 is an end view of luminaire 160 comprising boat-shaped TIR lens 161 with upper exit surface 161e and conical lateral surface 161s, and correspondingly confocal lensed light sources 162s and 163s, each dedicated to its respective oppositely situated TIR lens-slice 162t and 163t. Light sources 162s and 163s correspond to details of FIGS. 42-43, respectively comprising central LED chips 162c and 163c, reimaging reflectors 162r and 163r, and free-form lenses 162L and 163L.

Figure 45:
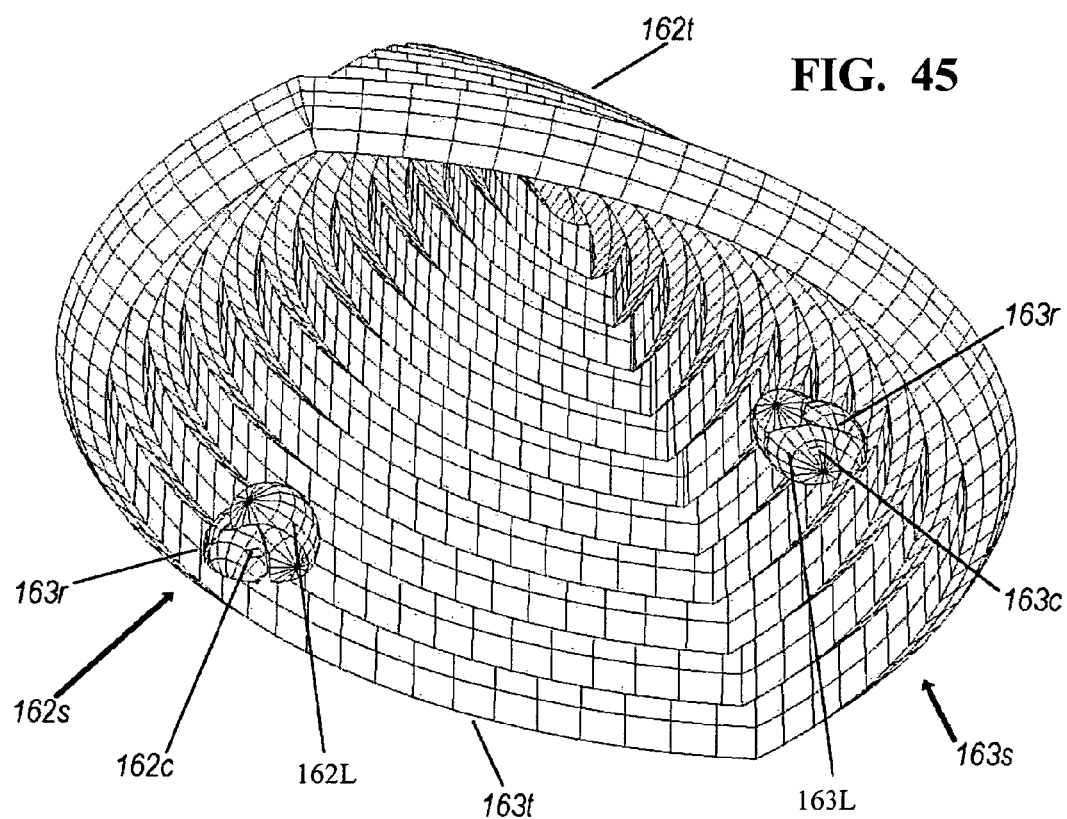
FIG. 45 shows a view from below of a boat lens similar to that of FIG. 44 utilizing sections of a circular TIR lens.

FIG. 45 is a perspective view from below of TIR lens slices 162t and 163t, and correspondingly confocal lensed light sources 162s and 163s, cutaway to reveal LED chips 162c and 163c. Reimaging reflectors 162r and 163r are configured to face outward and away from corresponding TIR lens 162t and 163t.

In the embodiment depicted in FIGS. 44 and 45, the sources 162s, 163s are positioned below the TIR lenses 162t and 163t, respectively. This blow-lens, out-of-beam position of the source of a TIR-lens collimator allows the source to be positioned so that the source does not block the beam. Thus, in a TIR boat lens the sources can be positioned somewhat inside the lens periphery, rather than fixed on the periphery as they would in the reflector versions discussed above. This positioned allows each source 162s, 163s to have an unblocked view of its corresponding TIR-lens collimator, 162t, 163t.

In some preferred embodiments, the facet number of the TIR lens are optimized in relation to the location of its cutting plane so that the central portions of luminaire 160 have illuminated facets. The mold sections for the injection molding of this preferred embodiment could advantageously be sections of a single circularly symmetric mold conventionally fabricated by rotating machinery. In these preferred embodiments, the TIR boat-lens advantageously has both light sources situated from their corresponding TIR-lens slices 162t, 163t, that the resultant exit beams have a narrow range of beamlet sizes. The freeform lens configuration of the sources 162s, 163s, shown in FIGS. 42-43 can be shaped for use with the TIR lens 161 so as to direct illumination over the TIR lens slices 162t, 163t to give good uniformity of illuminance at exit-surface 161e of boat-shaped TIR lens 161.

The present embodiments employ novel design principles and combinations of those design principles. One aspect of some present embodiments utilizes in-mold placement of chip-on-board light emitting diodes (LED) within an injection-molded immersive optical device. Another aspect of some of the present embodiments provides an enhanced optical source by etendue squeezing, a novel optical principle disclosed herein. Additionally, some preferred embodiments utilizes multi-sector ellipsoidal reimaging mirrors as a particular means of implementing etendue-squeezing. The present invention additionally employs compact folded-optic configurations utilizing tailored free-form surfaces to meet particular output prescriptions, particularly low-beam and high-beam automotive forward lighting.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for use in generating illumination, comprising:
   a first light source;
   a generally planar reflective base positioned adjacent to and extending away from the first light source; and
   a reimaging reflector positioned separated from the first light source and partially surrounding the first light source, where the reimaging reflector extends from the generally planar reflective base to partially reflectively surround the first light source, where a first percentage of light is emitted from the first light source in a first solid angle and does not strike the reimaging reflector, and a second remaining percentage of light emitted from the first light source is reflected from the reimaging reflector to the generally planar reflective base and is further reflected from the generally planar reflective base to be directed into substantially a same solid angle as the first solid angle of the first percentage of light emitted from the first light source thereby achieving etendue squeezing of the first light source.

2. The apparatus of claim 1, wherein the second percentage of light is approximately half of the light emitted from the first light source, where the reimaging reflector reflects at least a portion of the second percentage of light to the reflective base adjacent the first light source, where the portion of the second percentage reflected to the reflective base defines a first real image of the first light source adjacent the first light source such that the reflective base reflects the light of the first real image into substantially the first solid angle.

3. The apparatus of claim 2, wherein that the first light source and the adjacent first real image define a virtual light source thereby reducing a solid angle of light emissions without substantially increasing etendue of the first light source.

4. The apparatus of claim 3, wherein the reimaging reflector is generally a quarter ellipsoid with a first focus positioned on the first light source and a second focus positioned proximate the first light source at a position of the first real image adjacent the first light source such that the second focus is further positioned at a distance below the reflective base approximately equal to twice a height of a light emitting surface of the first light source from a reflective surface of the reflective base.

5. The apparatus of claim 1, wherein the reimaging reflector is approximately quarter-spherical and comprises a first reflective surface defined by a first sector of a first prolate ellipsoid and a second reflective surface defined by a second sector of a second prolate ellipsoid, where the first and second reflective surfaces are adjacent and joined along a first axis aligned with the first light source, where a first portion of the second percentage of the light reflected from the reimaging reflector is reflected from the first reflective surface to the reflective base adjacent the first light source defining a first real image of the first light source adjacent the first light source on a first side of the first light source such that the reflective base reflects the light of the first real image into substantially the first solid angle, and a second portion of the second percentage of the light reflected from the reimaging reflector is reflected from the second reflective surface to the reflective base adjacent the first light source establishing a second real image of the first light source adjacent the first light source at a second side of the first light source opposite the first side of the first light source and separated from the first real image by the first light source, such that the reflective base reflects the light of the second real image into substantially the first solid angle.

6. The apparatus of claim 5, wherein the first and second real images are aligned with the first light source along a second axis that is about perpendicular to the first axis such that the aligned first light source, the first real image and the second real image define a virtual source having a surface area that is at least twice a surface area of the first light source.

7. The apparatus of claim 5, wherein the first reflective surface of the reimaging reflector is defined by the first ellipsoid having first and second foci, and the second reflective surface of the reimaging reflector is defined by the second ellipsoid having third and fourth foci;
  the first reflective surface is positioned relative to the first light source such that the first focus is positioned on the first light source and the second focus is positioned to the first side of the first light source proximate the first light source at a position of the first real image; and
  the second reflective surface is positioned such that the third focus is positioned on the first light source and the fourth focus is positioned to the second side of the first light source proximate the first light source at a position of the second real image.

8. The apparatus of claim 1, wherein the reimaging reflector comprises four sectors distributed along an axis aligned with the first light source where each of the four sectors are defined by one of four prolate ellipsoids, where a first portion of light reflected from the reimaging reflector is reflected by first and second sectors of the reimaging reflector to the reflective base at a first side of the first light source establishing a first real image of the first light source, and where a second remaining portion of light reflected from the reimaging reflector is reflected by third and fourth sectors of the reimaging reflector to the reflective base adjacent the first light source on a second side of the first light source establishing a second real image of the first light source adjacent the first light source, such that the reflective base reflects the light of the first and second real images.

9. The apparatus of claim 1, further comprising:
  a tailored free-form exit face positioned such that the first percentage of light emitted into the first solid angle from the first light source and the second percentage of light reflected by the reimaging reflector and reflective base is emitted from the exit face establishing an output illumination that meets a predefined prescription.

10. The apparatus of claim 1, further comprising:
  an optical system wherein the first light source is positioned proximate the optical system such that the optical system receives the light at substantially the first solid angle as emitted from the first light source and reflected from the reimaging reflector and the reflective base.

11. The apparatus of claim 10, wherein the optical system comprises the reimaging reflector, and a cavity in which the first light source is positioned.

12. The apparatus of claim 11, wherein the lens further comprises:
  first reflective surface positioned to receive the light at substantially the first solid angle as emitted from the first light source and reflected from the reimaging reflector and the reflective base;
  a reflector array positioned to receive and reflect light reflected from the first reflective surface;
  a mirrored surface positioned to receive and reflect reflected light from the reflector array; and
  an output surface through which the light reflected by the mirrored surface is emitted.

13. The apparatus of claim 10, wherein the optical system comprises a collimator that directs the light received at substantially the first solid angle as emitted from the first light source and reflected from the reimaging reflector and the reflective base into a collimated output beam.

14. The apparatus of claim 13, wherein the collimator comprises a totally internally reflecting (TIR) lens positioned proximate the first light source opposite from the reimaging reflector such that the TIR lens receives the light at substantially the first solid angle as emitted from the first light source and reflected from the reimaging reflector and the reflective base.

15. The apparatus of claim 14, wherein the TIR lens is a decentered lens comprising an exit face, a central refractive lens, grooved facets having entry faces to receive the light, and totally internally reflecting faces positioned relative to the grooved entry faces to receive the light entering the lens from the entry faces of the grooved facets and to reflect the received light to the exit face.

16. The apparatus of claim 14, wherein the TIR lens comprises a decentered generally rectangular TIR lens having dimensions of a rectangular section of length defined according to a defining complete circular TIR lens extend from a center to a peripheral edge of the defining complete circular TIR lens.

17. The apparatus of claim 13, wherein the collimator comprises a semicircular refractive, reflexive and internal reflection (RXI) lens positioned adjacent the light source to receive the light at substantially the first solid angle as emitted from the first light source and reflected from the reimaging reflector and the reflective base, and to emit the collimated beam.

18. The apparatus of claim 10, further comprising:
  a first additional reimaging reflector, a second additional reimaging reflector and at least an additional planar reflective surface, where the first additional reimagining reflector is positioned relative to the first light source to receive at least a first portion of the light emitted from the first light source at substantially the first solid angle and reflects the first portion of light to the additional planar reflective surface to be reflected into a second solid angle, the second additional reimagining reflector is positioned relative to the first light source to receive at least a second portion of the light emitted from the first light source at substantially the first solid angle and reflects at least a fraction of the second portion of light to the additional planar reflective surface to be reflected into the second solid angle.

19. The apparatus of claim 18, wherein the first and second additional reimaging reflectors comprise an ellipse cotangent to a confocal parabola with the second additionally reimaging reflector positioned about the first additional reimaging reflector.

20. The apparatus of claim 18, wherein the first and second additional reimaging reflectors comprise reflective surfaces comprising an ellipse segment cotangent to a confocal parabola segment with the confocal parabola segment and the ellipse segment both having a common axis of revolution and meeting with a same tangent.

21. The apparatus of claim 1, further comprising:
  a first luminaire comprising the a first light source, the generally planar reflective base and the reimaging reflector;
  a second luminaire comprising:
    a second light source;
    an additional generally planar reflective base positioned adjacent to and extending away from the second light source; and
    an additional reimaging reflector positioned separated from the second light source and partially surrounding the second light source, where the reimaging reflector extending from the generally planar reflective base to partially reflectively surround the second light source, where a first percentage of light is emitted from the second light source in a third solid angle and does not strike the additional reimaging reflector, and a second remaining percentage of light emitted from the second light source is reflected from the reimaging reflector to the additional generally planar reflective base and is further reflected from the additional generally planar reflective base to be directed into substantially a same solid angle as the third solid angle of the first percentage of light emitted from the second light source thereby achieving etendue squeezing of the second light source.

22. An apparatus for use in generating an illumination, comprising:
a first off-center etendue squeeze imaged light source; and
an optical system optically coupled with the first off-center light source such that the optical system receives the light emitted from the first off-center light source;
wherein the first off-center light source comprises:
a first reflective base;
a first light source positioned on the first reflective base; and
a first generally quarter spherical reimaging reflector optically aligned with the first light source, extending from the first reflective base and partially surrounding the first light source, where the first light source emits a first percentage of light such that it does not strike the first reimaging reflector and directs a second percentage of light at the first reimaging reflection, wherein the first reimaging reflector comprises a generally ellipsoidal reflective surface opposed to the first light source to reflect at least a portion of the second percentage of light emitted from the first light source to the first reflective base defining a first real image of the first light source adjacent the first light source, where the first reflective base reflects the light of the first real image away from the first reimaging reflector generally in alignment with the first percentage of light emitted from the first light source.

23. The apparatus of claim 22, further comprising:
a second off-center etendue squeeze imaged light source optically coupled with the optical system such that the optical system received the light emitted from the second off-center light source;
wherein the second off-center light source comprises:
a second reflective base;
a second light source positioned on the second reflective base; and
a second generally quarter spherical reimaging reflector optically aligned with the second light source, extending from the second reflective base and partially surrounding the second light source, where the second light source emits a first percentage of light such that the first percentage of light emitted from the second source does not strike the second reimaging reflector and directs a second percentage of light at the second reimaging reflection, wherein the second reimaging reflector comprises a generally ellipsoidal reflective surface opposed to the second light source to reflect at least a portion of the second percentage of light emitted from the second light source to the second reflective base defining a first real image of the second light source adjacent the second light source, where the second reflective base reflects the light of the first real image of the second light source away from the second reimaging reflector generally in alignment with the first percentage of light emitted from the second light source.

24. The apparatus of claim 23, wherein the optical system comprises a totally internally reflecting (TIR) lens positioned proximate the first and second off-center light sources such that the TIR lens receives the first percentage of light from the first and second light sources and the light of the first real images of the first and second light sources reflected by the first and second reflective bases, respectively.

25. The apparatus of claim 24, wherein the TIR lens comprises an exit face, grooved facets having entry faces to receive the light, and totally internally reflecting faces positioned relative to the grooved entry faces to receive the light entering the lens from the entry faces of the grooved facets and to reflect the received light to the exit face.

26. The apparatus of claim 22, wherein the optical system comprises a semicircular refractive, reflexive and internal reflection (RXI) lens positioned adjacent the light source to receive the first percentage of light from the first light source and the light of the first real image of the first light source reflected by the first reflective base, and to emit a collimated beam.

27. The apparatus of claim 22, wherein the first off-center light source comprises
a second reimaging reflector, a third reimaging reflector and a second planar reflective surface, where the second reimagining reflector is positioned relative to the first light source to receive at least a first portion of the light emitted from the first light source and reflects the first portion of light to the second planar reflective surface such that the second planar reflective surface reflects the first portion of light, the third reimagining reflector is positioned relative to the first light source to receive at least a second portion of the light emitted from the first light source and reflects at least a fraction of the second portion of light to the second planar reflective surface such that the second planar reflective surface reflects the fraction of the second portion of light.

28. The apparatus of claim 27, wherein the second and third reimaging reflectors comprise an ellipse cotangent to a confocal parabola with the third reimaging reflector positioned about the second reimaging reflector.

29. The apparatus of claim 27, wherein the second and third reimaging reflectors comprise reflective surfaces comprising an ellipse segment cotangent to a confocal parabola segment with the confocal parabola segment and the ellipse segment both having a common axis of revolution and meeting with a same tangent.

* * * * *